US008403083B2

(12) United States Patent
Waita et al.

(10) Patent No.: US 8,403,083 B2
(45) Date of Patent: Mar. 26, 2013

(54) INVERTED PENDULUM TYPE VEHICLE

(75) Inventors: Hironori Waita, Saitama (JP); Kazushi Hamaya, Saitama (JP); Hiroshi Gomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/883,624

(22) Filed: Sep. 16, 2010

(65) Prior Publication Data

US 2011/0067943 A1  Mar. 24, 2011

(30) Foreign Application Priority Data

Sep. 18, 2009  (JP) ................................ 2009-217928

(51) Int. Cl.
*B62K 1/00* (2006.01)
*B62J 1/04* (2006.01)
*B62J 1/08* (2006.01)

(52) U.S. Cl. .. 180/21; 297/204; 297/284.3; 297/195.11; 296/65.02; 296/65.05

(58) Field of Classification Search .................. 280/235, 280/266, 226.1, 47.25; 180/21, 311, 312; 297/201, 314, 312, 202, 213, 284.3, 268.2, 297/195.11, 195.1, 195.12, 196, 198, 215, 297/258.1, 208; 601/91; D12/119; 296/65.02, 296/65.05

See application file for complete search history.

(56) References Cited

U.S. PATENT DOCUMENTS

| 5,167,435 | A  | * | 12/1992 | Aldi ............................... 297/201 |
| 7,399,244 | B2 | * | 7/2008 | Takebayashi et al. .......... 474/70 |
| 7,823,676 | B2 | * | 11/2010 | Yamada et al. ................ 180/218 |
| 2007/0216131 | A1 | * | 9/2007 | Potappel ..................... 280/250.1 |
| 2008/0265641 | A1 | * | 10/2008 | Kim ............................... 297/312 |
| 2010/0096905 | A1 | | 4/2010 | Takenaka et al. |

FOREIGN PATENT DOCUMENTS

WO  2008/132779 A1  11/2008

* cited by examiner

*Primary Examiner* — Faye M Fleming
*Assistant Examiner* — Keith Frisby
(74) *Attorney, Agent, or Firm* — Carrier Blackman & Associates, P.C.; Joseph P. Carrier; William D. Blackman

(57) ABSTRACT

In a vehicle (1) including a frame (2) incorporated with a drive unit (3) for enabling the frame to travel in a prescribed direction and a seat assembly (4) supported by the frame and including a pair of saddle members (63) defining a pair of seat surfaces (70A), respectively, configured to jointly support buttocks of a vehicle occupant, the saddle members are resiliently supported by the frame in such a manner that the seat surface of each saddle member is in an approximately horizontal orientation but is progressively tilted inward with a downward movement of the saddle member under a load of a vehicle occupant. Thus, one of the saddle members receiving a greater load than the other tilts downward toward the center of the vehicle, and this causes the vehicle occupant to be urged toward the saddle member receiving a smaller load so that the vehicle occupant is automatically urged toward the center of the vehicle, and hence the gravitational center of the vehicle occupant may be placed in the center of the vehicle at all times.

11 Claims, 16 Drawing Sheets

INVERTED PENDULUM TYPE VEHICLE

TECHNICAL FIELD

The present invention relates to a vehicle provided with a pair of saddle members defining a pair of seat surfaces, respectively, configured to jointly support buttocks of a vehicle occupant, and in particular to an inverted pendulum type vehicle provided with such saddle members which is capable of traveling in both a fore and aft direction and a lateral direction while maintaining an upright orientation, and in particular to a seat assembly suitable for such a vehicle.

BACKGROUND OF THE INVENTION

Known is an inverted pendulum type vehicle or an omnidirectional vehicle comprising a pair of drive assemblies individually actuated by electric motors and a main wheel held between the drive assemblies and frictionally driven by the drive assemblies. See WO2008132779A1 (US20100096905A1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

In such an inverted pendulum type vehicle, the inverted pendulum control is performed not only with respect to the fore and aft direction but also with respect to the lateral direction. Therefore, when the vehicle occupant (or rider) is improperly seated, typically causing the weight of the vehicle occupant to be unevenly distributed with respect to the lateral direction, the vehicle may travel laterally so as to compensate for the uneven distribution of the vehicle occupant. In particular, when the seat is constructed such that the vehicle occupant cannot readily change the sitting position, the vehicle occupant may have some difficulty in controlling the direction of the movement of the vehicle.

BRIEF SUMMARY OF THE INVENTION

In view of such problems of the prior art, a primary object of the present invention is to provide a vehicle fitted with a seat assembly including a pair of laterally arranged saddle members that allows a vehicle occupant to sit in a stable manner.

A second object of the present invention is to provide a vehicle fitted with a seat assembly including a pair of laterally arranged saddle members that allows a vehicle occupant to evenly distribute a load of the vehicle occupant between the two saddle members.

According to the present invention, such objects can be accomplished by providing a vehicle including a frame incorporated with a drive unit for enabling the frame to travel in a prescribed direction and a seat assembly supported by the frame; the seat assembly comprising: a pair of arm members extending laterally to either lateral side of the frame and each having a base end pivotally supported by the frame around a pivot center extending in a fore and aft direction; a pair of saddle members each pivotally supported by a free end of the corresponding arm member around a pivot center extending in a fore and aft direction, the saddle members defining a pair of seat surfaces, respectively, configured to jointly support buttocks of a vehicle occupant; a spring member resiliently urging the arm members in an upward direction; and a mechanism for maintaining the seat surface of each saddle member in an approximately horizontal orientation and converting a downward movement of each arm member against a spring force of the spring member into an inward tilting movement of the corresponding saddle member.

Thereby, one of the saddle members receiving a greater load than the other tilts downward toward the center of the vehicle, and this causes the vehicle occupant to be urged toward the saddle member receiving a smaller load so that the vehicle occupant is automatically urged toward the center of the vehicle, and hence the gravitational center of the vehicle occupant may be placed in the center of the vehicle at all times.

According to a preferred embodiment of the present invention, each mechanism comprises a first link member pivotally connected to a free end of the corresponding arm member and a second link member pivotally connected to both the frame and the first link member so as to form a four-bar linkage jointly with the frame and arm member, the first link member fixedly supporting the corresponding saddle member. It is also possible to use other mechanisms such as those using gears.

The present invention is particularly beneficial when applied to an inverted pendulum type vehicle or a vehicle having a vertically elongated frame supporting the seat assembly in an upper part thereof and the drive unit in a lower part thereof.

According to another aspect of the present invention, the seat assembly comprises a pair of arm members extending laterally to either lateral side of the frame; and a pair of saddle members each supported by a free end of the corresponding arm member, the saddle members defining a pair of seat surfaces, respectively, configured to jointly support buttocks of a vehicle occupant; the seat surfaces being each provided with a downward inclination toward a central part of the vehicle during use.

The downward inclination of the seat surfaces toward the center of the vehicle urges the buttocks of the vehicle occupant to be urged toward the center of the vehicle, and this also promotes the gravitational center of the vehicle occupant to be placed in the center of the vehicle at all times.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
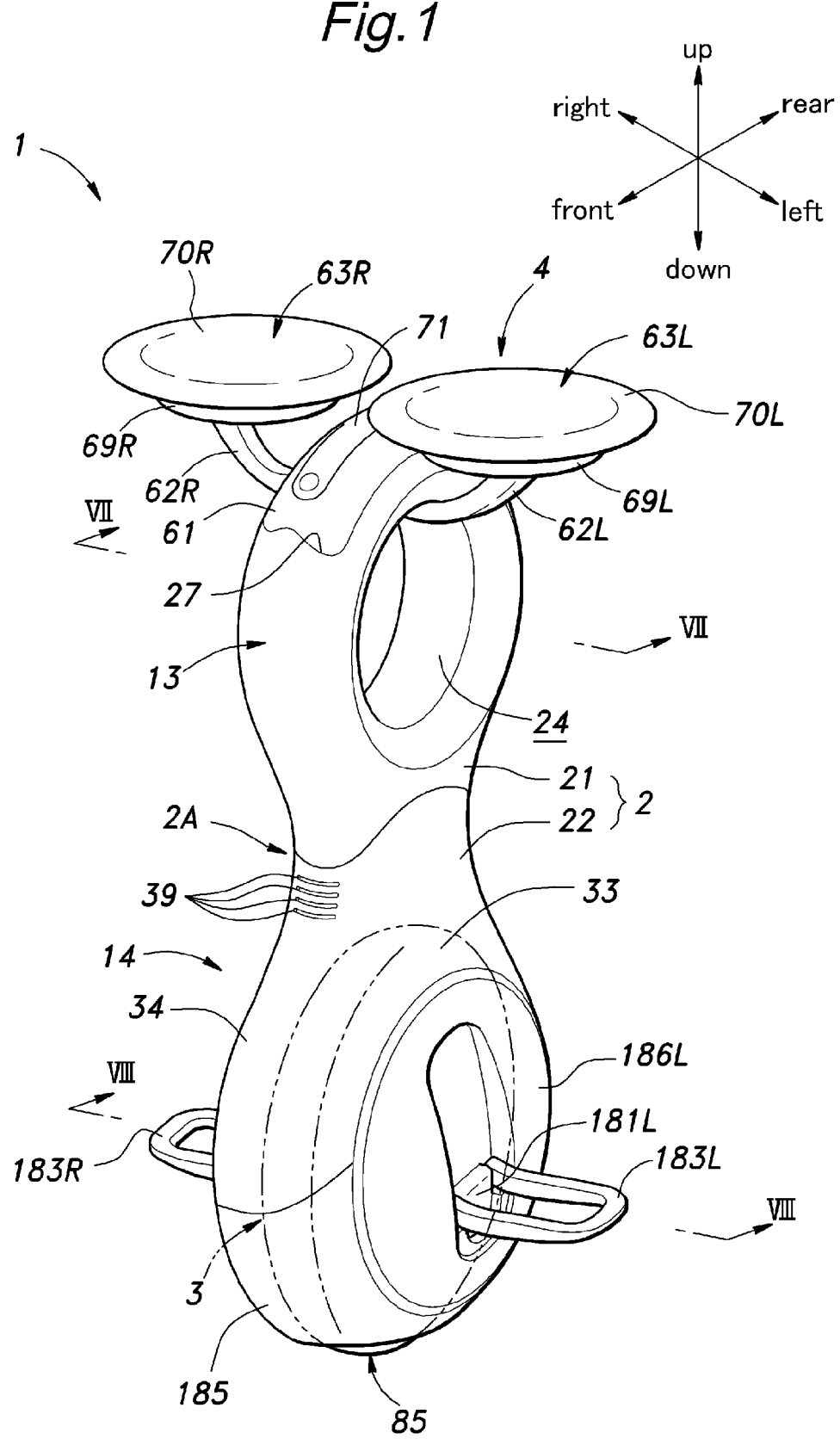
FIG. 1 is a perspective view of an inverted pendulum type vehicle embodying the present invention with a seat assembly deployed for a vehicle occupant to sit thereon and steps deployed for the feet of the vehicle occupant to rest thereon.
Figure 2:
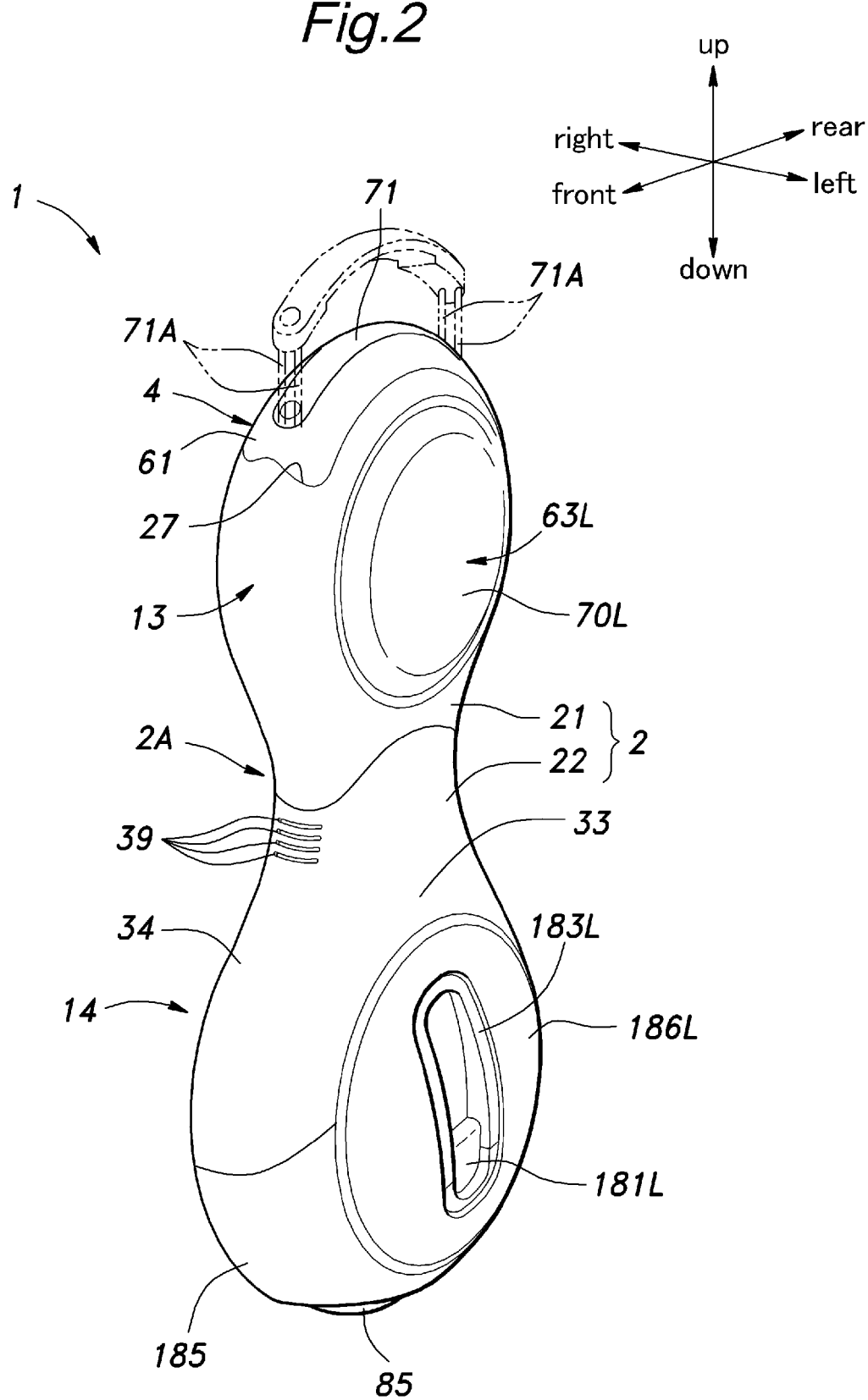
FIG. 2 is a view similar to FIG. 1 showing the vehicle ready to be transported with the seat assembly and steps retracted.

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals are also used without the suffix in the following description to denote such components collectively.

Referring to FIGS. 1 to 5, the inverted pendulum type vehicle 1 given as a first embodiment of the present invention comprises a frame 2 elongated in a vertical direction, a drive unit 3 incorporated in a lower part of the frame 2, a seat assembly 4 incorporated in an upper part of the frame 2, an electric unit 11 received in an inner middle part of the frame 2 and a battery unit 10 received in an upper part of the frame 2 to power the drive unit 3 and electric unit 11 as well as various sensors. The electric unit 11 comprises an inverted pendulum control unit 5, an upper load sensor 6 and an inclination sensor 7. The control unit 5 controls the drive unit 3 according to the principle of the inverted pendulum control based on output signals received from various sensors so as to maintain the vehicle 1 in an upright posture. The sensors include a pair of step load sensors 8 and rotary encoders 9.

Figure 4:
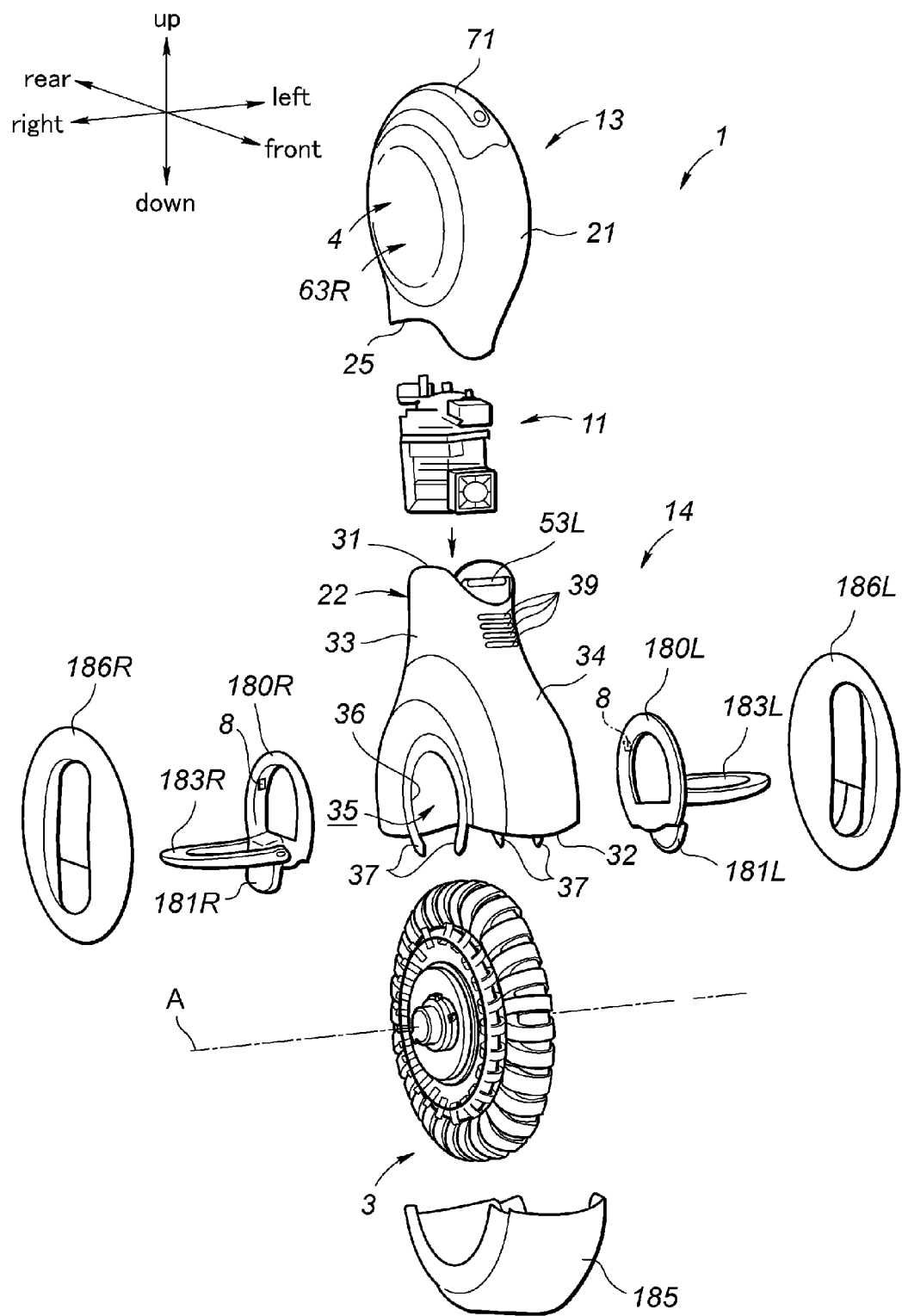
FIG. 4 is an exploded perspective view of the vehicle.

Referring to FIG. 1, the frame 2 is formed as a hollow shell, and have a substantially greater fore and aft dimension than a lateral dimension as seen in a horizontal cross section. The frame 2 includes a narrow section 2A which is narrow as seen from a side, or has a side profile in the shape of numeral "8". The frame 2 is divided into an upper frame 21 and a lower frame 22 at the narrow section 2A as best illustrated in FIG. 4. Each of the upper and lower frames 21 and 22 is made of dry carbon (carbon fiber reinforced plastic material) which is formed by thermally curing carbon pre-impregnated sheets. The upper frame 21 and lower frame 22 are joined to each other via the upper load sensor 6 (FIG. 5) which will be described hereinafter.

Figure 5:
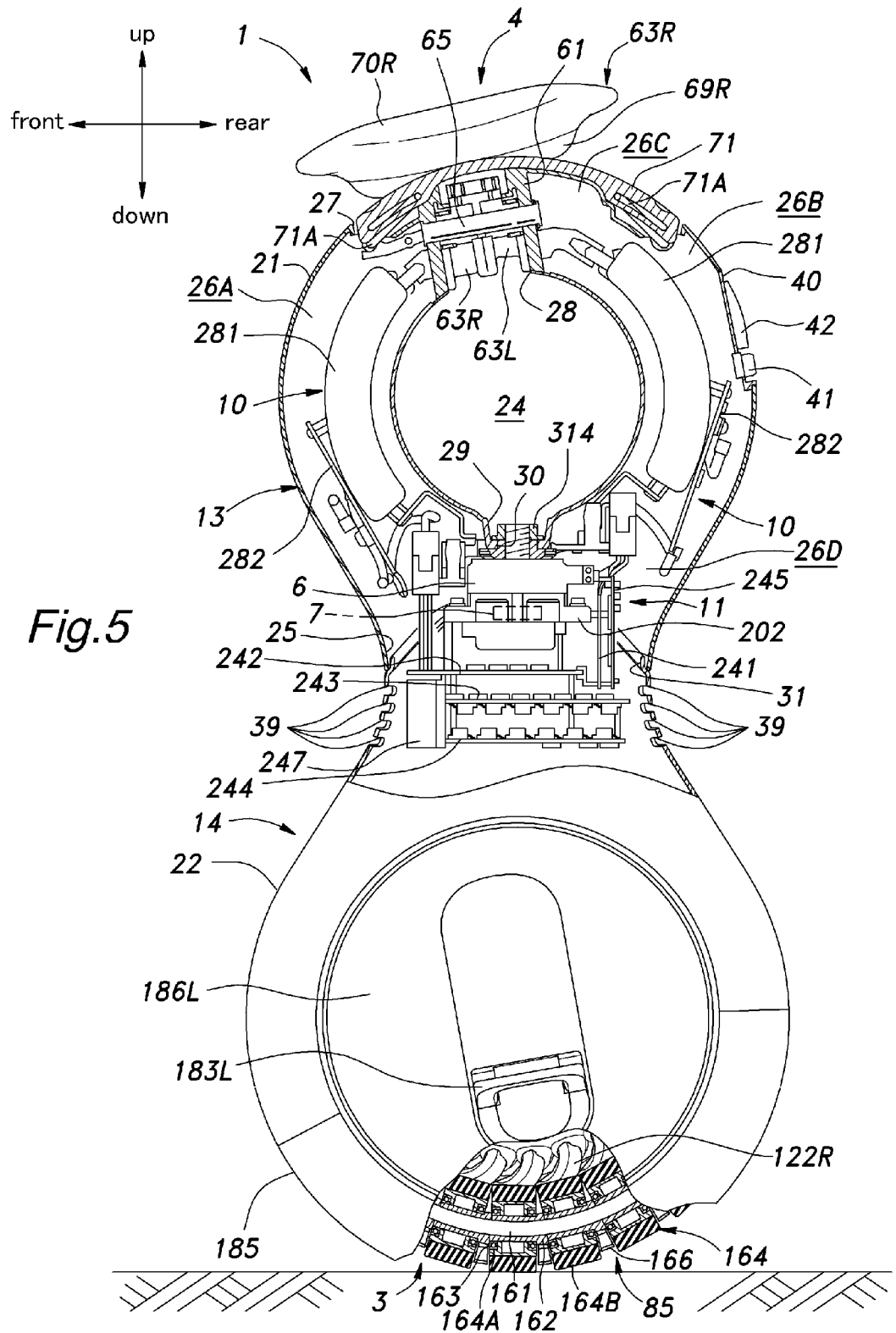
FIG. 5 is a side view of the vehicle mostly in section.

As shown in FIG. 5, the upper frame 21 is given with an annular shape so as to define a central space or a saddle storage space 24 passed laterally across the upper frame 21. The hollow interior of the upper frame 21 includes a front space 26A, a rear space 26B, an upper space 26C, and a lower space 26D. The lower end of the upper frame 21 is formed with a lower opening 25 facing downward. The upper end of the upper frame 21 is formed with an upper opening 27 communicating the upper space 26C with the exterior of the upper frame 21. The wall of the upper frame 21 separating the upper space 26C from the saddle storage space 24 is formed with a saddle mounting hole 28. The wall of the upper frame 21 separating the lower space 26D from the saddle storage space 24 is formed with a recess 29 which is recessed downward, and a connecting hole 30 is formed centrally in the bottom wall of the recess 29.

The upper frame 21 thus defines an annular interior, and the battery unit 10 includes a pair of arcuate parts, one received in the front space 26A and the other in the rear space 26B so as to conform to the arcuate form of the corresponding spaces.

Figure 3:
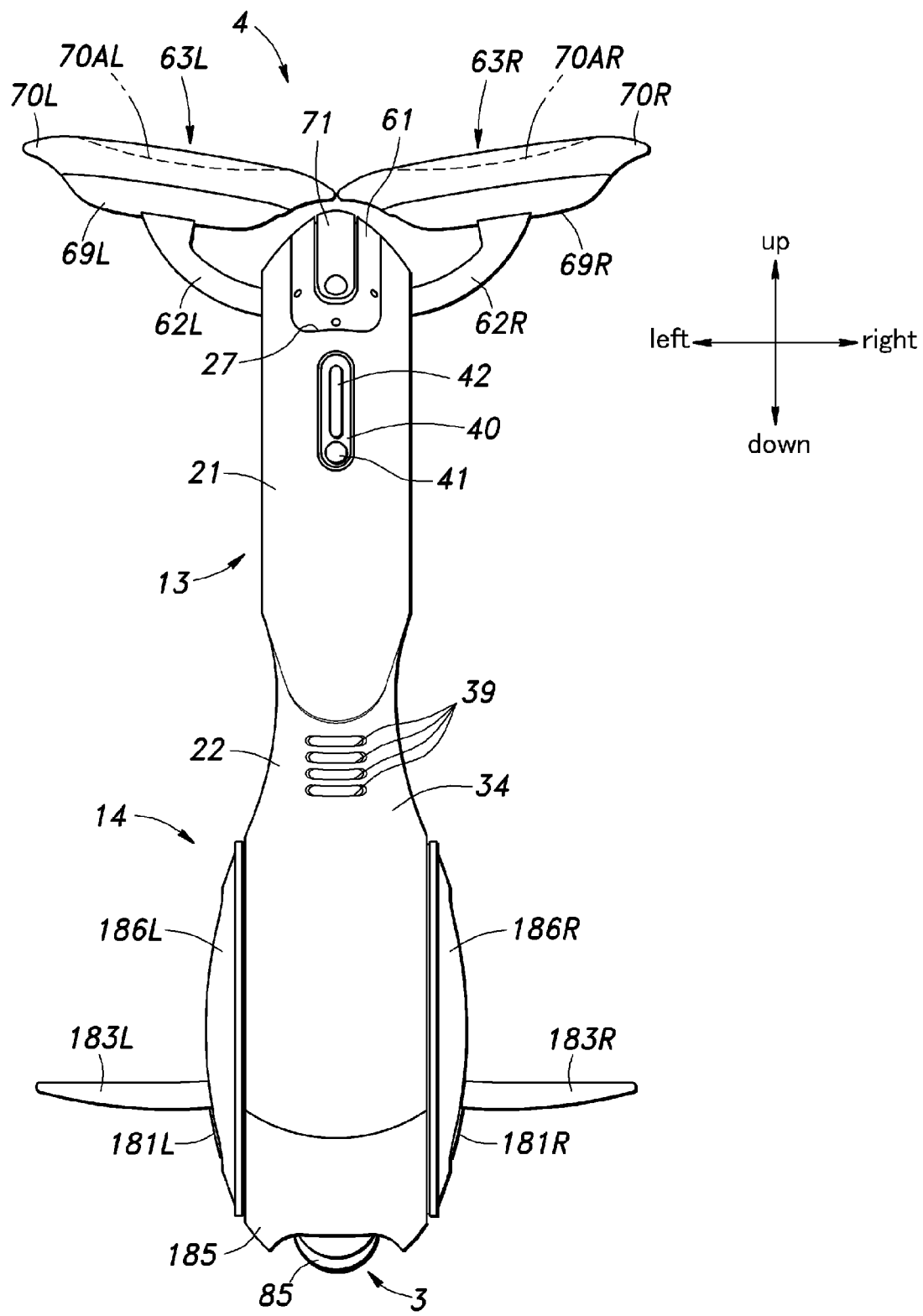
FIG. 3 is a front view of the vehicle ready to be ridden.

As shown in FIG. 3, to a rear side of the upper frame 21 is secured a switch panel 40 which includes a power switch 41 to turn on and off the main power of the vehicle 1 and a power lamp 42 that lights up when the main power is turned on.

Figure 6:
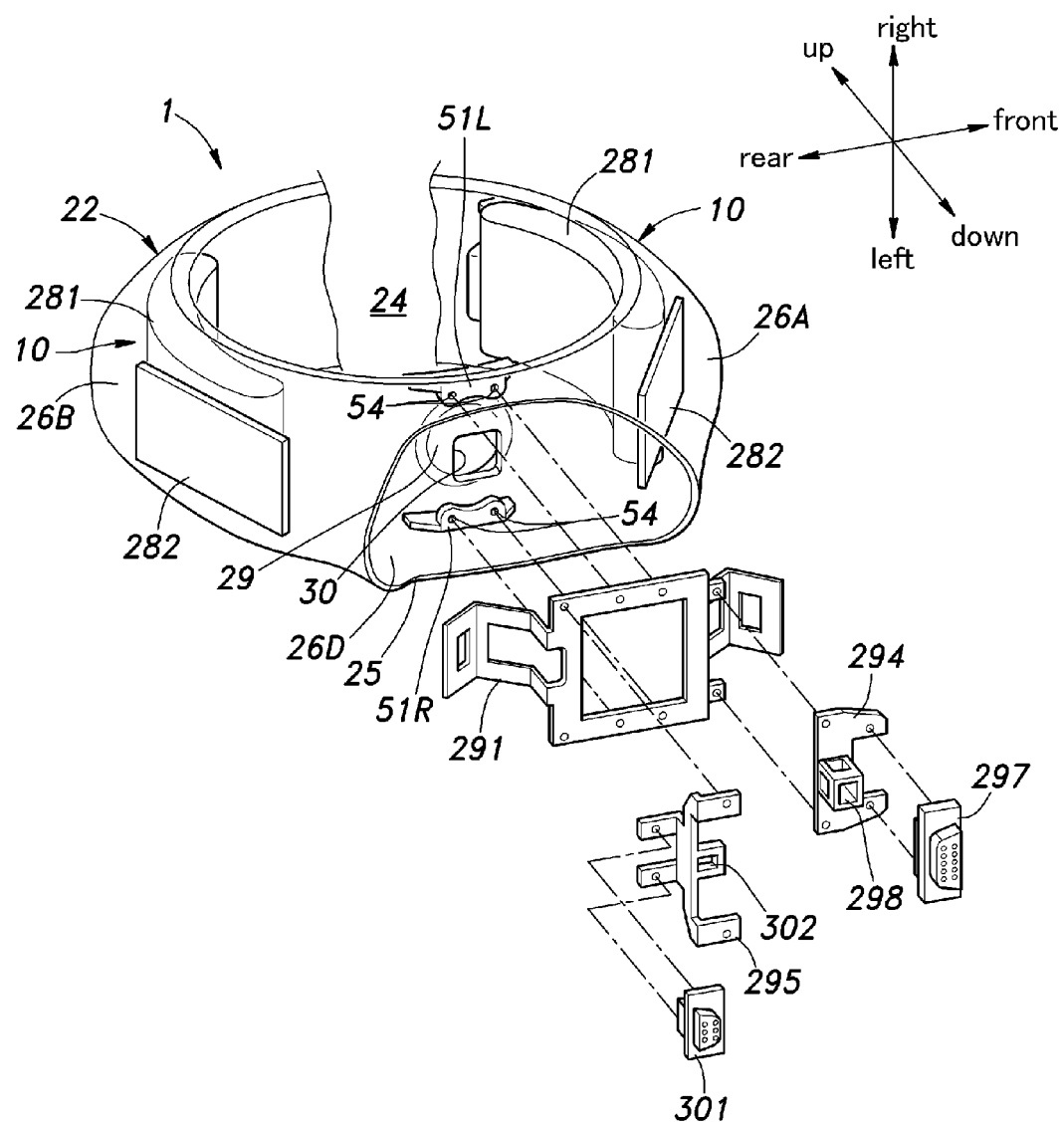
FIG. 6 is a partly broken away exploded perspective view of an upper structure of the vehicle.

As shown in FIG. 6, to the inner surface of the upper wall of the lower inner space 26D are attached a pair of metallic support bases 51 on either lateral side of the recess 29. Each support base 51 is provided with a horizontal plate section extending in the fore and aft direction, and a pair of threaded holes are formed vertically in the horizontal plate section one behind the other.

As shown in FIG. 4, the lower frame 22 is also made of a hollow shell having an upper opening 31 and a lower opening 32. The lower frame 22 includes a pair of side walls 33 extending vertically in mutually parallel relationship, and is generally elongated in the fore and aft direction. The front and rear walls 34 bulge in forward and rearward directions, respectively, adjacent to lower parts thereof so that a lower part of the lower frame 22 presents a substantially semi-circular side profile. The lower part of the lower frame 22 defines a receiving space 35 for receiving an upper half of the drive unit 3.

The lower edge of each side wall 33 of the upper frame is provided with a semi-circular cutout 36 substantially concentric to the semi-circular side profile of the lower frame 22. The semi-circular cutouts 36 of the two side walls 33 are conformal and coaxial to each other. Each semi-circular cutout 36 is flanked by a pair of tongue pieces 37 depending therefrom as seen in a side view. The upper part of each of the front and rear walls 34, adjacent to the narrow section 2A of the frame 2, is formed with vent openings 39 which, in this case, consist of a plurality of laterally elongated holes arranged vertically in mutually parallel relationship.

To the inner surface of an upper end of each side wall 33, adjacent to the upper opening 31, is fixedly attached a metallic support base 53 which includes a horizontal plate section extending in the fore and aft direction, and a pair of threaded holes 54 are formed in the horizontal plate section one behind the other.

Figure 8:
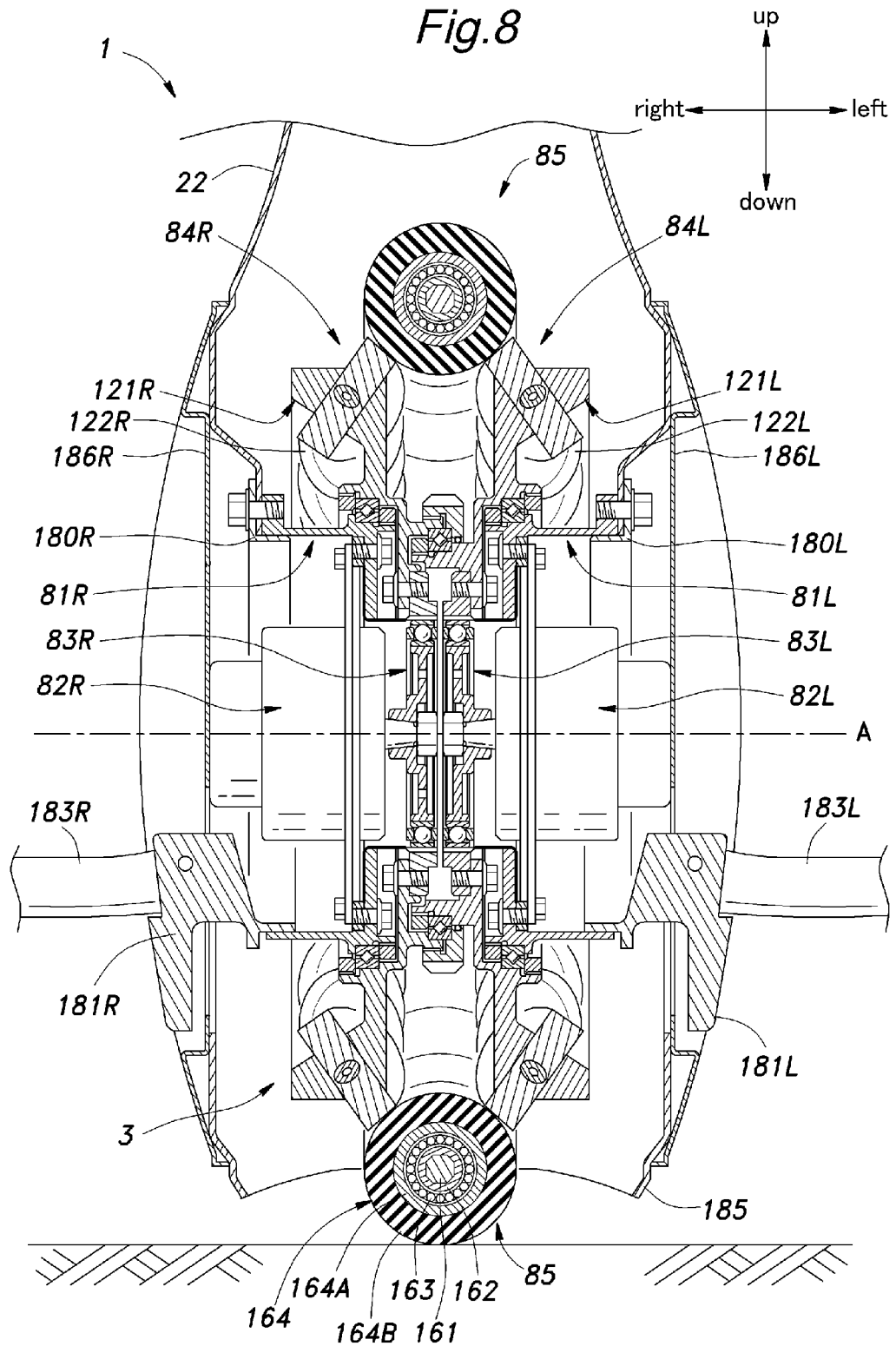
FIG. 8 is a sectional view taken along line VIII-VIII of FIG. 1.

Referring to FIG. 5, the upper frame 21 forms an upper structure 13 in cooperation with the seat assembly 4 and battery unit 10, and the lower frame 22 forms a lower structure 14 in cooperation with the drive unit 3, electric unit 11 and sensors 8 and 9 (FIGS. 4 and 8). The upper structure 13 can be separated from the lower structure 14 when necessary.

Figure 7:
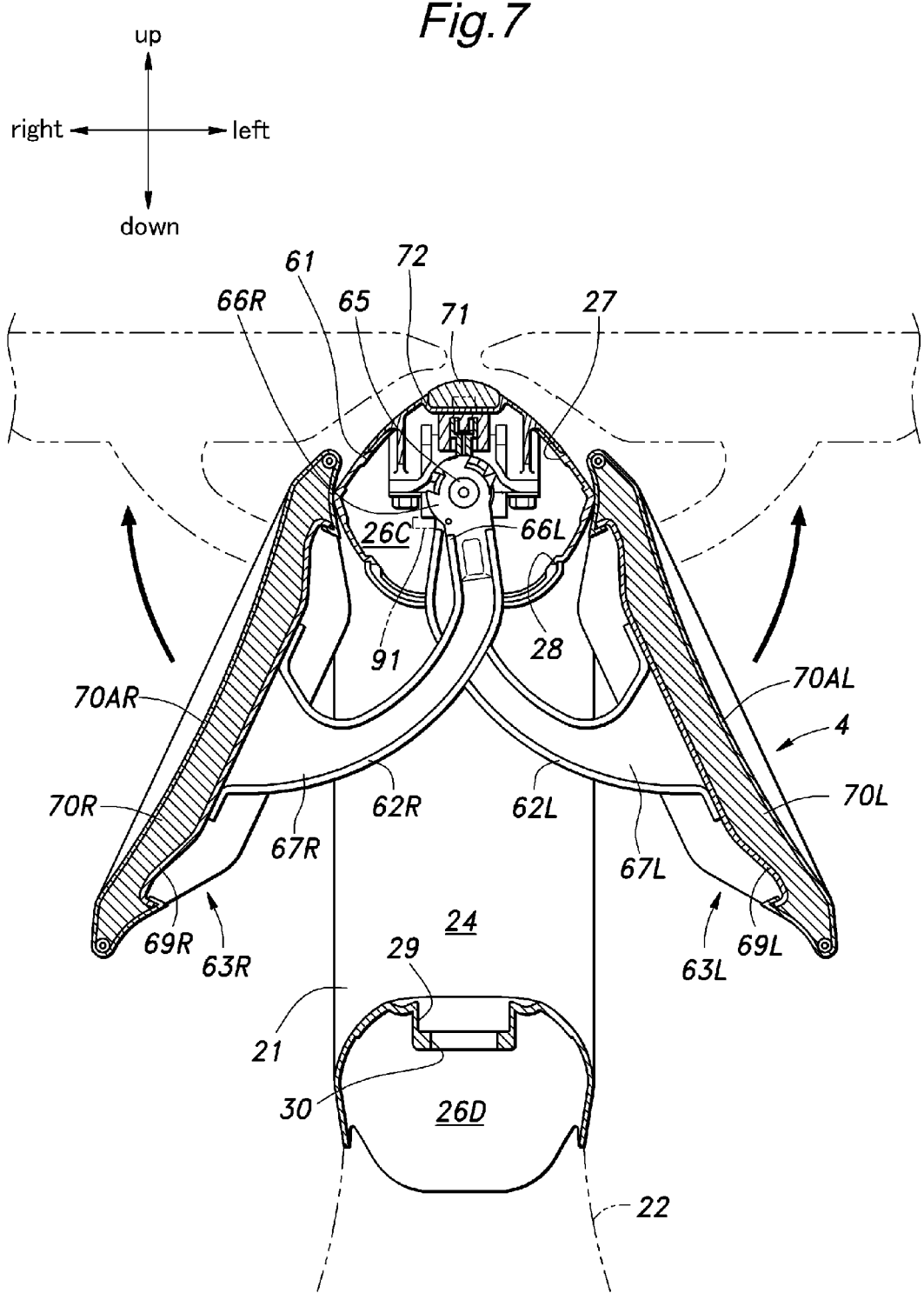
FIG. 7 is a sectional view taken along line VII-VII of FIG. 1.

Referring to FIG. 7, the seat assembly 4 includes a base main body 61, a pair of saddle arms 62 and a pair of saddle members 63. The base main body 61 is installed in the upper space 26C from the upper opening 27, and an upper wall of the base main body 61 closes the upper opening 27. An upper part of the base main body 61 is provided with a support shaft 65 extending in the fore and aft direction.

The support shaft 65 pivotally supports the base ends 66 of the saddle arms 62. Each saddle arm 62 extends from the base end 66 thereof, and is passed through the saddle mounting hole 28. The free end 67 of each saddle arm 62 is therefore located outside of the upper frame 21. The left saddle arm 62L is rotatable between a retracted position in which the free end 67L thereof is located below the base end 66L thereof or within the saddle storage space 24 and a deployed position (service position) located to the left of the base end 66L thereof. Similarly, the right saddle arm 62R is rotatable between a retracted position in which the free end 67R thereof is located below the base end 67R thereof or within the saddle storage space 24 and a deployed position (service position) located to the right of the base end 66R thereof. Each saddle arm 62 is curved so that the convex side thereof faces downward in the deployed position thereof.

The saddle arms 62 are connected to each other via a link mechanism not shown in the drawings so that one of them may be retracted when the other one is retracted, and deployed when the other one is deployed. The base main body 61 is provided with a lock member (not shown in the drawings) which is selectively engaged by an engagement hole provided in each of the saddle arms 62 so that the saddle arms 62 may be fixed at each of the retracted position and deployed position as required.

The free end 67 of each saddle arm 62 is fitted with a saddle member 63 that includes a support portion 69 by which the saddle member 63 is connected to the saddle arm 62 and a disk shaped cushion pad 70 supported by the support portion 69. Each cushion pad 70 defines a seat surface 70A, on a side thereof opposite from the support portion 69, for supporting a buttock of a vehicle occupant. As shown in FIG. 3, when the saddle arms 62 are in the deployed position, each saddle member 63, in particular the seat surface 70A thereof, is given with a downward slant toward a middle part of the vehicle. Each cushion pad 70 is configured to support a corresponding buttock of the vehicle occupant, and the load of the vehicle occupant is transmitted to the upper frame 21 via the saddle members 63, saddle arms 62 and base main body 61.

When the saddle arms 62 are in the retracted position, the support portions 69 of the saddle members 63 are received within the saddle storage space 24 and the cushion pads 70 close the respective sides of the saddle storage space 24 so that the upper frame 21 presents a smooth side contour.

The upper wall of the base main body 61 is fitted with a retractable grip handle 71 that can be used for lifting and carrying the vehicle 1 by the user, much like a grip handle of a suitcase. When not in use, the grip handle 71 may be received in a handle receiving recess 72 formed in the upper wall of the base main body 61 as indicated by the solid lines in FIG. 2. When in use, the grip handle 71 is raised above the base main body 61, and connected to the base main body 61 via a pair of legs 71A as indicated by the imaginary lines in FIG. 2. Each leg 71A includes a base end pivotally connected to the base main body 61 and a free end pivotally connected to the grip handle 71 via a slot formed in the grip handle 71. Therefore, when the vehicle is powered off, the user can lift and carry the vehicle 1 or maintain the vehicle in the upright posture by holding the grip handle 71.

Figure 9:
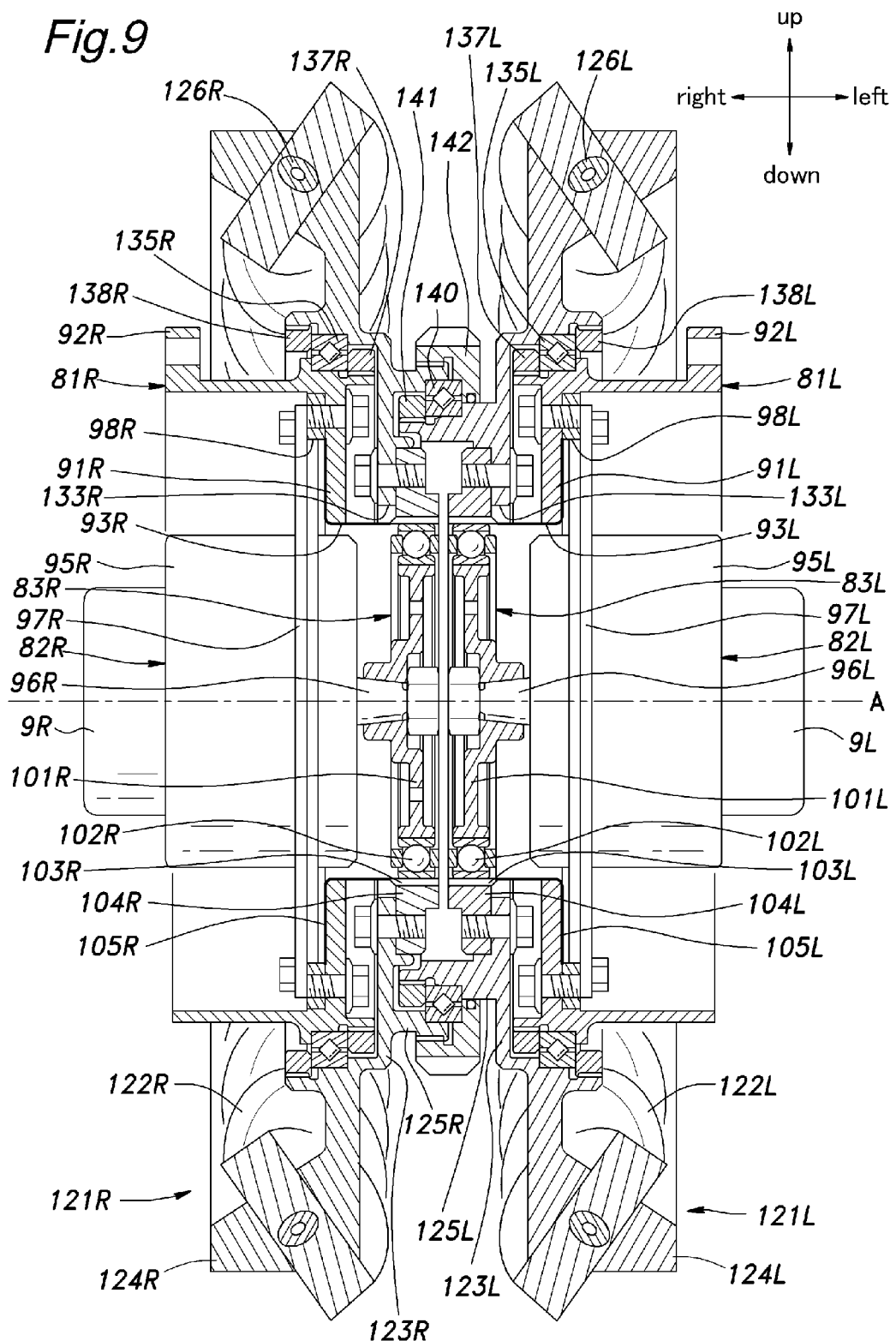
FIG. 9 is an enlarged sectional front view of a drive unit of the vehicle.

As shown in FIGS. 8 and 9, the drive unit 3 comprises a pair of symmetrically opposing drive assemblies 84 each comprising a mount member 81 fixedly attached to the lower frame 22, an electric motor 82 mounted on the mount member 81, a wave gear device 83 for reducing the rotational speed of the output shaft of the motor 82, and a drive disk 121 rotatively actuated by the electric motor 82 via the wave gear device 83. The drive unit 3 further comprises a main wheel 85 interposed between the two drive assemblies 84, and rotatively actuated by the two drive assemblies 84.

As shown in FIGS. 8, 9, each mount member 81 consists of a cylindrical member having an axial line thereof directed laterally, and is provided with a radial internal flange 91 on an inner axial end thereof and a radial external flange 92 on an outer axial end thereof. The mount member 81 receives the corresponding electric motor 82 therein, and the output shaft thereof extends inwardly through a central opening 93 of the radial internal flange 91.

Each electric motor 82 consists of a brushless DC motor, and comprises a cylindrical stator housing 95 internally fitted with stator coils (not shown in the drawings), a rotor shaft 96 rotatably supported by the stator housing 95 and having an end (output shaft) extending out of the stator housing 95, and a permanent magnet (not shown in the drawings) fixedly attached to the rotor shaft 96 in the stator housing 95. The stator housing 95 is provided with a radial flange 97 on an outer periphery thereof, which is placed on the radial internal flange 91 of the mount member 81, one over the other, via a spacer 98, and these two flanges 96 and 91 are joined to each other by threaded bolts. Thereby, a space is defined between the two flanges 97 and 91, and the electric motor 82 is coaxially supported by the mount member 81. The free end of the rotor shaft 96 (output shaft) is connected to an input end of the wave gear device 83, and the opposite end of the rotor shaft 96 is connected to an input end of a rotary encoder 9 of a per se known type whose housing is attached to the stator housing 95.

The wave gear mechanism 83 may consist of a per se known structure, and comprises a wave plug 101 consisting of a member having an elliptic profile and serving as an input member, a wave bearing 102 fitted on the wave plug 101, a flexible external gear member 103 consisting of a flanged cylindrical thin shell frictionally engaging the outer circumferential surface of the wave bearing 102 and provided with external teeth on the outer circumferential surface thereof, and the internal gear member 104 consisting of a stiff ring and provided with internal teeth meshing with the external teeth of the external gear member 103. The external gear member 103 is provided with a flange 105 axially extending therefrom through the central opening 93 of the central opening 93 of the radial internal flange 91, and further extending radially to be fixedly interposed between the two flanges 96 and 91. The wave plug 101 is coaxially connected to the rotor shaft 96, and the rotation of the rotor shaft 96 is transmitted to the internal gear member 104 at a large reduction ratio.

As shown in FIGS. 8 and 9, each drive assembly 84 further comprises a plurality of drive rollers 122 rotatably supported by the drive disk 121. The drive disk 121 includes a central disk portion 123 having a coaxial through hole 133, a large annular portion 124 extending outwardly in the axial direction from the outer periphery of the central disk portion 123 and a small annular portion 125 extending inwardly in the axial direction from the central disk portion 123 at a slightly radially inward part thereof. The inner diameter of the large annular portion 124 is greater than the outer diameter of the cylindrical portion of the mount member 81 so that the cylindrical portion of the mount member 81 overlaps with the large annular portion 124 by a certain axial length.

The drive rollers 122 are arranged along the periphery of the corresponding drive disk 121 at a regular interval, and are rotatably supported by respective roller shafts 126 such that the planes of rotation of the drive rollers 122 are each disposed neither in parallel to nor perpendicular to the axial center line (center of rotation) A of the drive disk 121. The positional relationship of the drive rollers 122 on the drive disk 121 may be similar to the gear teeth of a helical bevel gear of a prescribed cone angle. For more detailed description of the drive unit, see WO2008/139740A (US20100096905A1). The roller shafts 126 are positioned such that the outer periphery of each drive roller 122 is located radially more outward than the outer periphery of the large annular portion 124.

The inner diameter of the small annular portion 125R of the right drive disk 121R is larger than the outer diameter of the small annular portion 125L of the left drive disk 121L. The right drive disk 121R is otherwise similar to the left drive disk 121L.

Each drive disk 121 is rotatably supported by the outer circumferential surface of the cylindrical portion of the mount member 81 coaxially thereto via a crossed roller bearing 135 which is configured to support both a radial load and an axial (thrust) load. The crossed bearing 135 is kept immobile in the axial direction by fastening rings 137 and 138 threaded onto the drive disk 121 and mount member 81, respectively.

When the drive disk 121 is assembled to the mount member 81 as described above, the wave gear device 83 is placed inside the through hole 133 of the central disk portion 123 of the drive disk 121. An outer peripheral part of the internal gear member 104 of the wave gear device 83 is attached to the central disk portion 123 of the drive disk 121 by threaded bolts. Thus, the rotational output of the electric motor 82 is transmitted to the drive disk 121 at a reduced speed.

The two drive disks 121L and 121R are held coaxial to each other owing to a crossed roller bearing 140 interposed between the outer circumferential surface of the small annular portion 125L of the left drive disk 121L and the inner circumferential surface of the small annular portion 125R of the right drive disk 121R. The crossed bearing 140 is kept immobile in the axial direction by fastening rings 141 and 142 threaded onto the small annular portions 125L and 125R of the left and right drive disks 121L and 121R, respectively.

Thus, the two mount members 81L and 81R, electric motors 82L and 82R, wave gear devices 83R and 83L and drive disks 121L and 121R are disposed on the common axial line (center of rotation) A. When the two drive assemblies 84L and 84R are fully assembled, the two sets of drive rollers 122L and 122R are spaced from each other by a prescribed distance, and interpose the main wheel 85 in an approximately coaxial relationship between them.

The main wheel 85 comprises an annular member 161 made of a ring having a polygonal cross section, a plurality of inner sleeves 162 fixedly fitted on the annular member 161 at a regular interval and a driven roller 164 rotatable supported by the outer circumferential surface of each sleeve 162 via a ball bearing 163. The driven rollers 164 are configured to engage a floor surface G, and may each consist of a metal cylinder 164A fitted on the outer race of the ball bearing 163 and a rubber cylinder 164B integrally vulcanized onto the outer circumferential surface of the metal cylinder 164A.

The driven rollers 164 along with the associated inner sleeves 162 are arranged circumferentially along the entire circumference of the annular member 161, and the driven rollers 164 are each freely rotatable around the axial line thereof which is tangential to the corresponding position of the annular member 162. A disk shaped cover 166 (see FIG. 5) is interposed between each adjacent pair of driven rollers 164 so as to close the wedge shaped gap between the adjacent driven rollers 164 and thereby keep foreign matter from intruding into the ball bearings 163.

The inner diameter of the main wheel 85 is smaller than the outer diameter of each drive assembly 84. The outer diameter of the main wheel 85 is larger than the outer diameter of the drive assemblies 84. The inner and outer diameters of the main wheel 85 and each drive assembly 84 are defined by the corresponding envelopes of the drive rollers 122 and driven rollers 164, respectively. The main wheel 85 is thus interposed between the drive rollers 122 of the two drive assemblies 84L and 84R.

The drive rollers 122L and 122R frictionally engage the rubber cylinders 164B of the driven rollers 164 at their respective circumferential surfaces so that the rotation (or torque) of the drive rollers 122L and 122R can be transmitted to the driven rollers 164.

The sizes and numbers of the driven rollers 164 and drive rollers 122L and 122R are selected in such a manner that at least one of the driven rollers 164 engages the floor or road surface G and at least one each of the left and right drive rollers 122L and 122R engages the driven roller 164 engaging the floor surface G. Thereby, the driven roller 164 engaging the floor surface G may receive a force that causes the rotation of the main wheel 85 around the central axial line A and/or the rotation of the driven roller 164 around the central axial line thereof (tangential to the annular member 161).

In the illustrated embodiment, the modes of rotation of the main wheel 85 and rotation of the driven rollers 164 are determined by the modes of rotation of the two drive disks 121L and 121R. When the two drive disks 121L and 121R are rotated at a same speed in a same direction, the main wheel 85 rotates circumferentially or around the central axial line A while the driven rollers 164 do not rotate around the respective axial lines so that the vehicle travels either in the forward or rearward direction depending on the rotational direction of the drive disks 121L and 121R.

When the two drive disks 121L and 121R are rotated at a same speed in opposite directions, the main wheel 85 remains stationary while the driven rollers 164 rotate around the respective axial lines so that the vehicle travels sideways depending on the rotational directions of the drive disks 121L and 121R.

When the two drive disks 121L and 121R are rotated at mutually different speeds, the main wheel 85 is rotated around the central axial line A at a speed corresponding to the average of the rotational speeds of the two drive disks 121L and 121R, and the drive rollers 164 are rotated around their respective axial lines at a speed corresponding to the difference between the rotational speeds of the two drive disks 121L and 121R.

Therefore, by suitably selecting the rotational speeds of the two drive disks 121L and 121R, the vehicle 1 is allowed to travel in any desired direction given as a composition of a fore-and-aft movement and a lateral movement.

The arrangement for attaching the drive unit 3 to the lower frame 22 is described in the following. As shown in FIG. 4, the upper half of the drive unit 3 is received in the receiving space 35 of the lower frame 22 such that the axial line A is directed laterally with respect to the frame 2. As shown in FIG. 8, the radial external flange 92 of each mount member 81 of the drive unit 3 engages the peripheral edge of the cutout 36 in the side wall of the lower frame 22 and the inner surface of the tongue piece 37.

As shown in FIGS. 4 and 8, a step base 180 is attached to the outer surface of each side wall 33 of the lower frame 22. The step base 180 consists of a metallic annular member having an outer profile conforming to those of the cutout 36 and tongue piece 37. The radial external flange 92 of each mount member 81 is formed with threaded holes, and corresponding through holes are formed in the peripheral part of the cutout 36 and tongue piece 37 so that the peripheral part of the cutout 36 and tongue piece 37 are firmly interposed between the step base 180 and radial external flange 92 by passing threaded bolts into the through holes and threading them into the threaded holes of the radial external flange 92 of each mount member 81. Thus, the two step bases 180 and the drive unit 3 are jointly attached to the lower frame 22.

As shown in FIG. 8, the lower part of the step base 180 is provided with an axial flange that is passed into the space defined between the two tongue pieces 37, and closely received by the inner circumferential surface of the mount member 81. The step base 180 is provided with a lower extension 181 having a base end including an upper part extending axially outward and a lower part generally depending therefrom. The base end of the lower extension 181 rotatably supports a base end of a step 183 via a pivot shaft extending in the fore and aft direction. The step 183 is rotatable between a retracted position extending upward along a side of the lower frame 22 and a deployed position extending laterally outward.

As shown in FIG. 4, a step load sensor 8 is attached to an outer surface of the step base 180. The load sensor 8 may consist of a per se know strain gauge configured to detect strain in the step base 180 when the step 183 is subjected to an external load typically consisting of a load applied by a foot of the vehicle occupant.

As shown in FIGS. 1 to 4, the lower end of the lower frame 22 is provided with a lower cover 185 which conceals the lower half of the drive unit 3 except for the ground contact area of the main wheel 85. To an outer side of each side wall 33 of the lower frame 22 is attached a side cover 186 which conceals the step base 180, but is provided with an opening to allow the step 183 to extend laterally and be raised upward and the lower extension 181 to be externally exposed.

Figure 10:
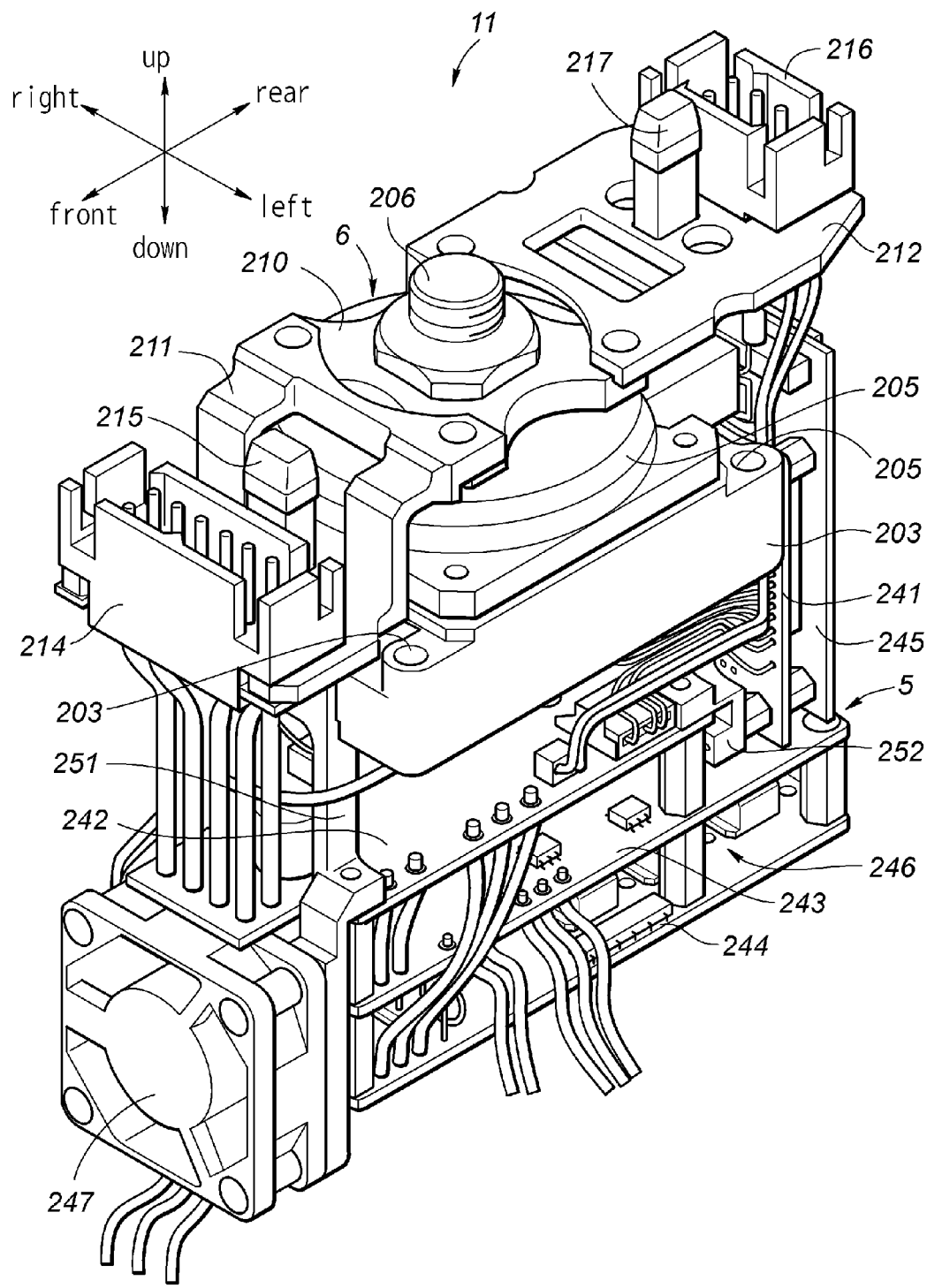
FIG. 10 is a perspective view of an electric unit of the vehicle.
Figure 11:
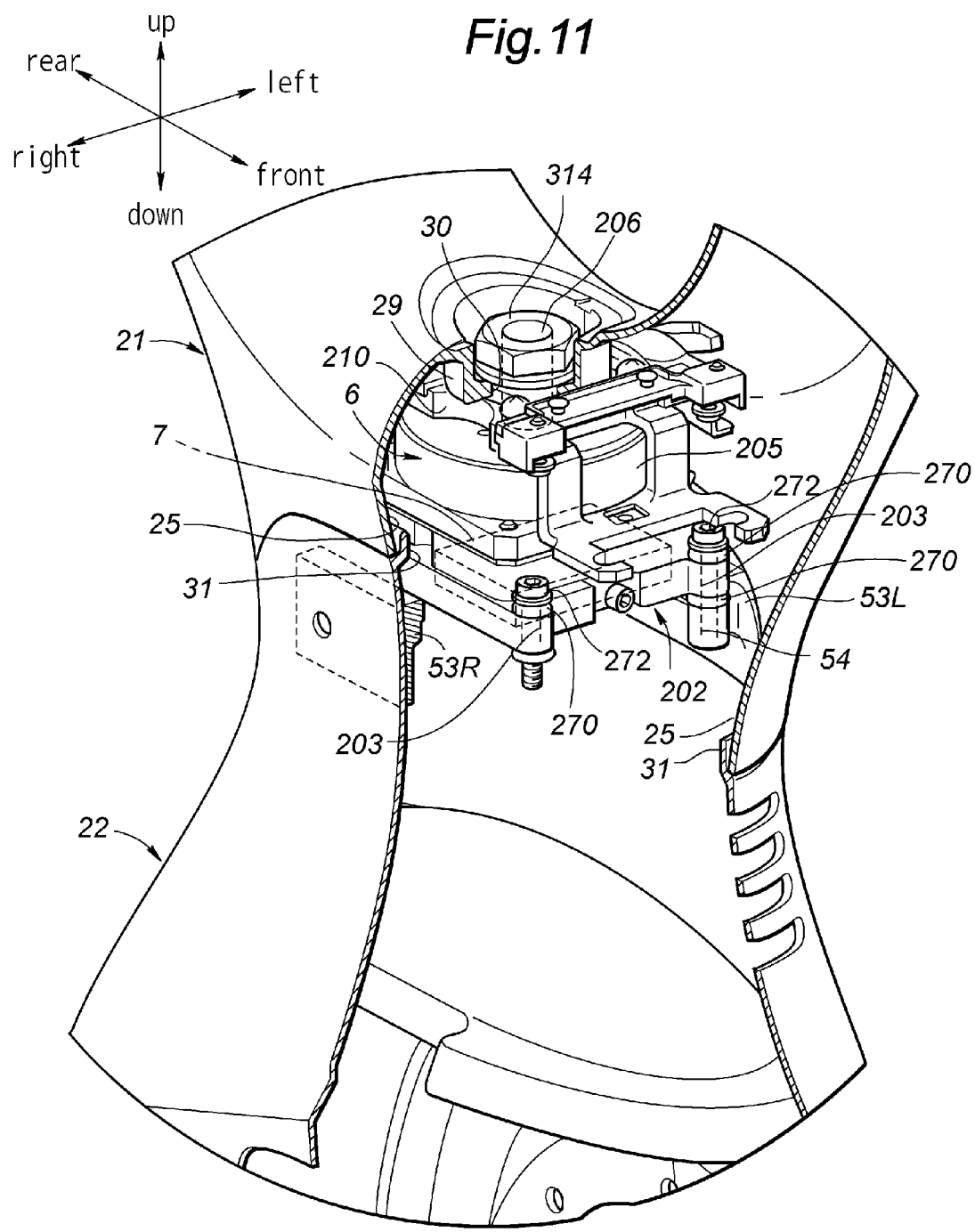
FIG. 11 is a fragmentary, partly broken away perspective view of a structure connecting an upper structure of the vehicle to a lower structure thereof.

Referring to FIGS. 10, 11, the various components of the electric unit 11 such as the control unit 5, upper load sensor 6 and inclination sensor 7 are fixedly attached to an electric mount frame 202.

The electric mount frame 202 essentially consists of a rectangular planar member defining a rectangular central opening, and rests upon the support bases 53 along the side edges thereof. The electric frame 202 is provided with a pair of through holes 203 along each side edge thereof so as to correspond to the threaded holes 54 of the support bases 53.

The upper load sensor 6 consists of a tri-axial force sensor that can detect moments around the z-axis (vertical direction), x-axis (for and aft direction) and y-axis (lateral direction), and includes a body portion 205 receiving a sensor circuit board (not shown in the drawings) and fixedly attached to the upper surface of the electric mount frame 202 by threaded bolts, and an input shaft 206 extending upward from the body portion 205 and formed with a male thread along the length thereof. The body portion 205 is mounted on the electric mount frame 202, and fixedly secured thereto by using threaded bolts.

The output input shaft 206 is threaded into a threaded central opening of a planar connecting member base 210, and a free end of the input shaft 206 projects upward from the connecting member base 210.

A first connector base 211 is attached to a front part of the connecting member base 210 by using threaded bolts, and extends forward. A first connector 214 which is electrically connected to the wiring from a power source circuit board 242 (which will be described hereinafter) is secured to the first connector base 211 by using threaded bolts. The first connector base 211 is provided with a first guide pin 215 extending upward.

A second base 212 is attached to a rear part of the connecting member base 210 by using threaded bolts, and extends rearward. A second connector 216 which is electrically connected to the wiring from a control circuit board 241 (which will be described hereinafter) is secured to the second connector base 212 by using threaded bolts. The second connector base 216 is provided with a second guide pin 217 extending upward.

The inclination sensor 7, which may consist of a per se known gyro sensor, is passed downward inside the electric mount frame 202, and fixedly secured thereto by using threaded bolts. The inclination sensor 7 is configured to detect an inclination angle thereof relative to a plumb vertical direction.

As shown in FIG. 10, the control unit 5 includes, in addition to the control circuit board 241 and power source circuit board 242, a left motor driver circuit board 243, a right motor driver circuit board 244, an I/O interface circuit board 245 and a blower fan 247.

The control circuit board 241 includes a control circuit 261 which is incorporated with a CPU formed by a microcomputer, and used for controlling the electric motors 82 and other components. The control circuit board 241 is mounted on a rear side of the electric mount frame 202 via a spacer so as to extend both vertically and laterally (or with the major surface thereof facing in the fore and aft direction). The lower part of the control circuit board 241 extends downward well beyond the lower side of the electric mount frame 202.

The power source circuit board 242 includes a power control circuit (not shown in the drawings) for converting the voltage of the power supplied by the battery unit 10 to a prescribed voltage. The power source circuit board 242 extends both laterally and in the fore and aft direction (or with the major surface thereof facing vertically), and is fixedly attached thereto via a first connecting member 251 extending downward from the front end of the electric mount frame 202. The rear end of the power source circuit board 242 is connected to the lower end of the control circuit board 241 via a second connecting member 252.

The left motor driver circuit board 243 and right motor driver circuit board 244 include a left motor driver circuit (inverter circuit) 253 and a right motor driver circuit (inverter circuit) 254 used for the PWM control of the left and right electric motors 82L and 82R, respectively. The left motor driver circuit board 243 is fixedly attached to the power source circuit board 242 via a spacer 401 from below in parallel thereto. The right motor driver circuit board 244 is fixedly attached to the left motor driver circuit board 243 via a spacer 401 from below in parallel thereto. Thereby, an air flow passage 246 extending in the fore and aft direction is defined between the left motor driver circuit board 243 and right motor driver circuit board 244.

The I/O interface circuit board 245 includes an input interface circuit 265 and an output interface circuit 266, and is fixedly attached to the electric mount frame 202 via a spacer behind the control circuit board 241 in parallel thereto.

The blower fan 247 consisting of an axial flow fan is connected to the lower end of the first connecting member 251 so as to face the space between the left motor driver circuit board 243 and right motor driver circuit board 244, and forwards an air flow into the space.

The structure for securing the electric unit 11 to the lower frame 22 is described in the following. As shown in FIG. 11, each through hole 203 of the electric mount frame 202 is fitted with a rubber bush 270 including a tubular portion received in the through hole 203 and a pair of radial flanges radially outwardly extending over the opposite surfaces of the electric mount frame 202 surrounding the through hole 203. After placing the electric mount frame 202 on the support bases 53 of the lower frame 22 via the corresponding flanges of the rubber bushes 270, threaded bolts 272 are passed into the through holes 203 (central holes of the rubber bushes 270), and threaded into the threaded holes 54 of the support bases 53. Thereby, the electric mount frame 202 is insulated and protected from the vibrations, that may be transmitted from the lower frame 22, by the rubber bushes 270.

The electric unit 11, in its installed state, is located in the narrow section 2A of the lower frame 22, and, in particular, the blower fan 247, left motor driver circuit board 243 and right motor driver circuit board 244 are located between the two sets of vent openings 39 formed in the front and rear walls 34A and 34B of the lower frame 22, respectively, so that the cooling air introduced from the front vent openings 39 is passed through the blower fan 247 and the space between the left and right motor driver circuit boards 243 and 244 before being expelled from the rear vent openings 39. Therefore, the left and right motor driver circuit boards 243 and 244 which are the major sources of heat among the various components of the electric unit 11 can be efficiently cooled. Also, as the electric unit 11 is located in the narrow section 2A of the lower frame 2A, the flow path between the two sets of vent openings 39 is relatively short, and this also contributes to the efficient cooling of the electric unit 11.

As shown in FIGS. 5 and 6, the battery unit 10 consisting of two arcuate parts, one received in the front space 26A and the other in the rear space 26B, includes a plurality of battery modules 281 and a pair of battery management circuit boards 282. The battery modules 281 are each cylindrical in shape, and are bundled together so as to fit in the inner space of the upper frame 21. The battery management circuit boards 282 include a battery management circuit 285 comprising a CPU formed by a microcomputer and associated memory. The battery management circuit 285 is connected to the battery modules 281 so as to control the charging and discharging of the battery modules 281, and select the battery modules 281 that are to be used at each particular moment.

The battery unit 10 is passed into the front space 26A and rear space 26B from the lower opening 25 of the upper frame 21, and is supported from below by a battery bracket 291 which is in turn secured to the support bases 51 of the upper frame 21 by using threaded bolts.

A third connector base 294 is fixedly attached to the front end of the battery bracket 291 by using threaded bolts, and extends forward therefrom. A fourth connector base 295 is fixedly attached to the rear end of the battery bracket 291 by using threaded bolts, and extends rearward therefrom.

A third connector 297 is secured to the third connector base 294 by using threaded bolts, and is electrically connected to the wiring extending from the battery management circuit boards 282. The third connector 297 is complementary to the first connector 214 so as to be connected thereto, and is provided with a first guide hole 298 extending in the vertical direction and configured to receive the first guide pin 215 of the first connector base 211.

A fourth connector 301 is secured to the fourth connector base 295 by using threaded bolts, and is electrically connected to the wiring extending from the switch panel 40. The fourth connector 301 is complementary to the second connector 216 so as to be connected thereto, and is provided with a second guide hole 302 extending in the vertical direction and configured to receive the second guide pin 217 of the second connector base 212.

Figure 12:
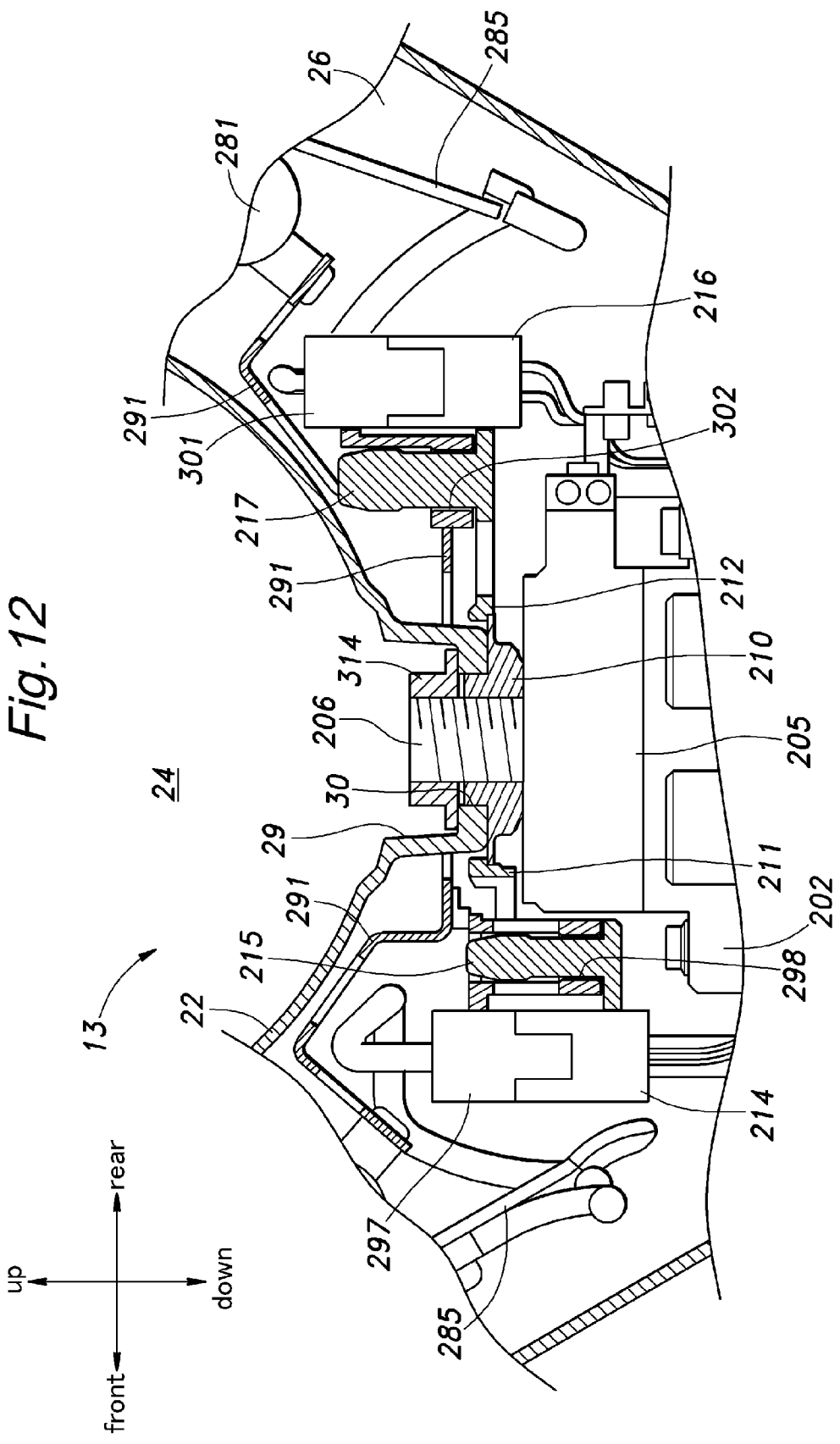
FIG. 12 is an enlarged fragmentary perspective view of the structure connecting the upper and lower structures to each other.

The structure for connecting the upper structure 13 including the upper frame 21, seat assembly 4 and battery unit 10 to the lower structure 14 including the lower frame 22, drive unit 3 and electric unit 11 is described in the following with reference to FIGS. 11 and 12. In the perspective view of FIG. 11, some of the components are omitted from the illustration for the convenience of illustration. As shown in FIGS. 11 and 12, when joining the upper and lower structures 13 and 14 to each other, the lower opening 25 of the upper frame 21 is opposed to the upper opening 31 of the lower frame 22, and the first guide pin 215 of the lower structure 14 is fitted into the first guide hole 298 of the upper structure 13 while the second guide pin 217 of the lower structure 14 is fitted into the second guide hole 302 of the upper structure 13. This causes the first connector 214 to be connected to the third connector 297, and the second connector 216 to the fourth connector 301. Thereby, the upper and lower structures 13 and 14 are electrically connected to each other so that distribution of electric power and transmission of control signals can be effected between the upper and lower structures 13 and 14.

The lower surface of the wall part of the upper frame 21 defining the recess 29 abuts the upper surface of the connecting member base 210 connected to the input shaft 206 of the upper load sensor 6, and the free end of the input shaft 206 is passed upward through the central connecting hole 30 of the recess 29. By threading a nut 314 onto the input shaft 206, the bottom wall of the recess 29 is firmly held between the connecting member base 210 and nut 314, and the upper frame 21 is supported by the input shaft 206 of the upper load sensor 6. The upper opening 31 of the lower frame 22 is slightly smaller that the lower opening 25 of the upper frame 21 so that the peripheral wall defining the upper opening 31 is received by the lower opening 25 of the upper frame 21.

Thus, the upper structure 13 is supported by the lower structure 14 solely via the load sensor 6 so that the load created by the seating of a vehicle occupant on the seat assembly 4 is transmitted to the input shaft 206 of the upper load sensor 6 via the upper structure 13.

Figure 13:
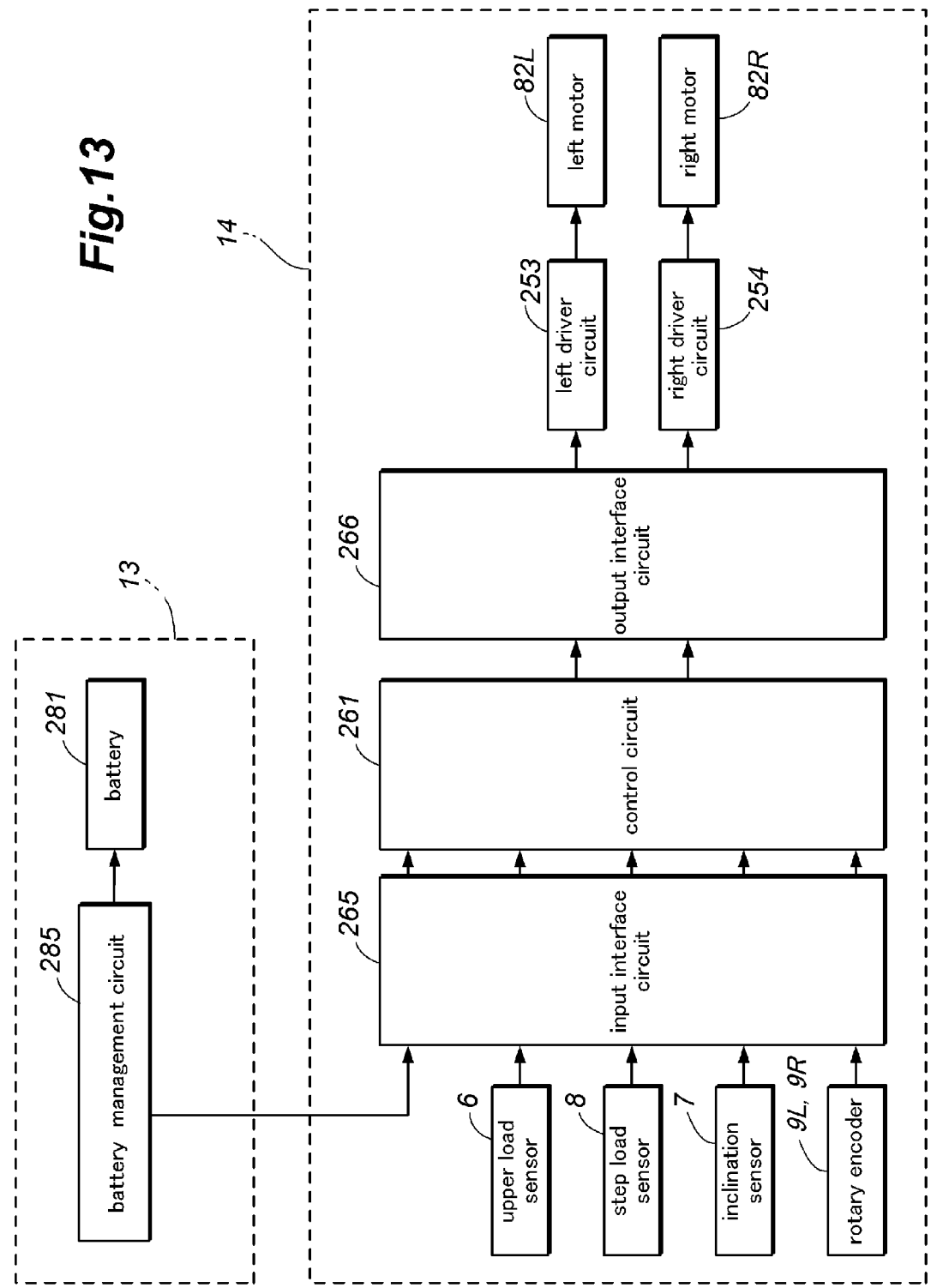
FIG. 13 is a block diagram of a control system for the vehicle.

As shown in FIG. 13, the control circuit 261 receives signals from the upper load sensor 6, inclination sensor 7, step load sensors 8, rotary encoders 9 and battery management circuit 285 via the input interface circuit 265. The control circuit 261 is configured to generate PWM signals for driving the left driver circuit 253 and right driver circuit 254 via the output interface circuit 266 so as to maintain the vehicle 1 in an upright posture or perform the inverted pendulum control according to the received signals.

The upper load sensor 6 forwards a signal corresponding to the load applied to the input shaft 206 to the control circuit 261. Each step load sensor 8 forwards a signal corresponding to the load applied to the corresponding step 183 to the control circuit 261. The inclination sensor 7 forwards a signal corresponding to the inclination thereof with respect to a prescribed reference line to the control circuit 261. Each rotary encoder 9 forwards a signal corresponding to the angular position of the corresponding rotor shaft (output shaft) 96 to the control circuit 261.

The control circuit 261 computes the load applied to the input shaft 206 according to the signal received from the upper load sensor 6, and determines if a vehicle occupant is seated on the seat assembly 4 by comparing the computed load with a prescribed threshold value. The control circuit 261 also computes the loads applied to the steps 183 according to the signals from the step load sensors 8, and determines if and how the vehicle occupant is placing his or her feet on the steps 183 by comparing the computed loads with prescribed threshold values.

Figures 14A, 14B:
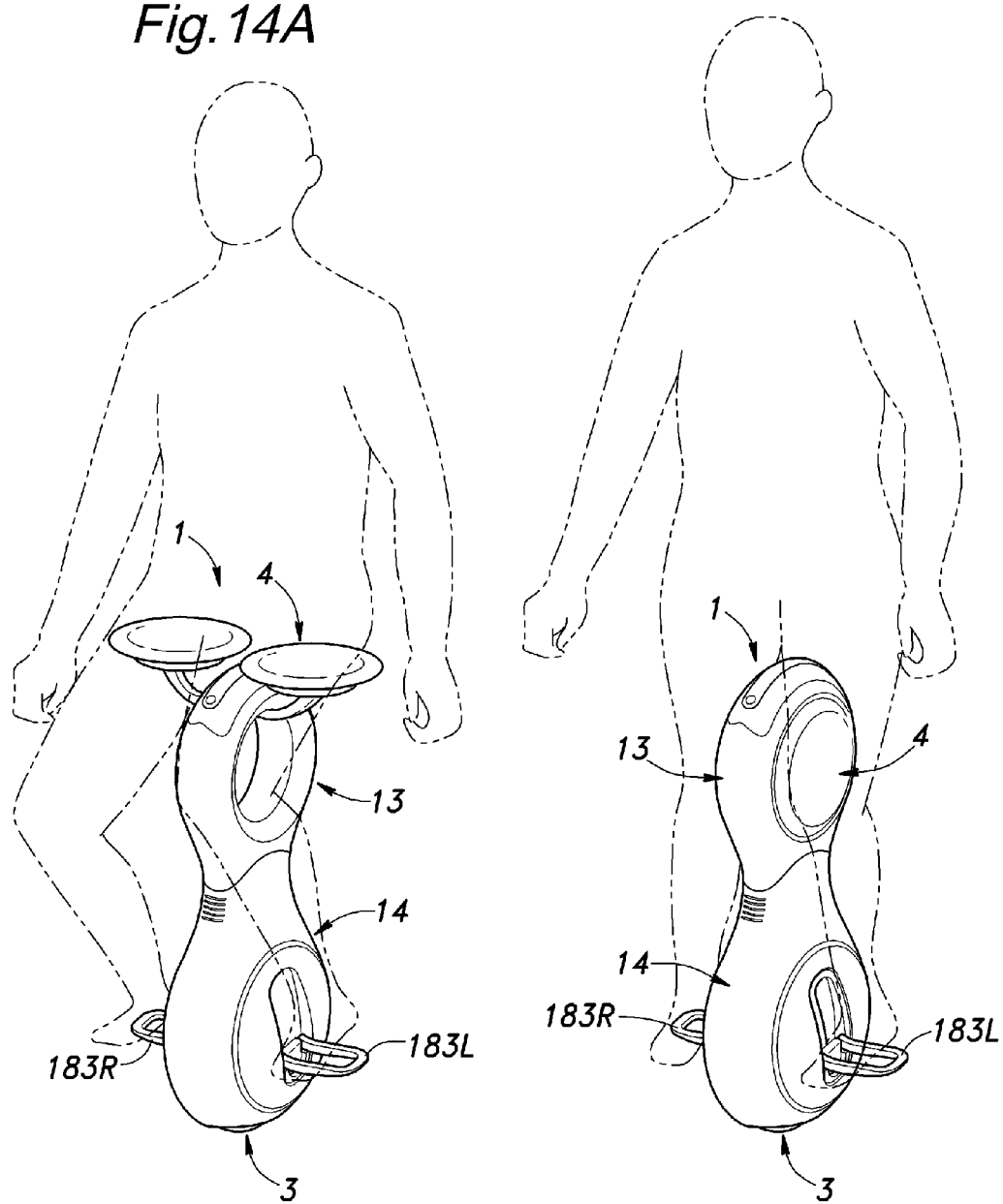
FIGS. 14a and 14b are perspective views of the inverted pendulum type vehicle in two different vehicle occupant situations, with the seat assembly deployed for a vehicle occupant to sit thereon and with the seat assembly retracted so that the vehicle occupant may ride the vehicle in a standing posture, respectively.

According to the results of determining if a vehicle occupant is seated on the seat assembly 4 and if the vehicle occupant is placing his or her feet on the steps 183, the control circuit 261 determines the presence of a vehicle occupant and the riding posture of the vehicle occupant. In the illustrated vehicle 1, the vehicle occupant may ride the vehicle 1 either in a sitting posture by sitting on the seat assembly 4 as illustrated in FIG. 14a, or in a standing posture by standing on the steps 183 and interposing the seat assembly 4 (which is in the retracted position at such a time) or in particular the cushion parts thereof with the knees and thighs of the vehicle occupant as illustrated in FIG. 14b. When no one is sitting on the seat assembly 4 and no feet are placed on the steps 183, it is then determined that there is no vehicle occupant on the vehicle 1. If someone is detected sitting on the seat assembly 4 with the upper load sensor 6, it can be determined that there is a vehicle occupant in the sitting posture. If the presence of feet on the steps 183 is determined by using the step load sensors 8, it can be determined that there is a vehicle occupant in the standing posture.

The control circuit 261 computes the rotational speeds of the two electric motors 82 according to the signals from the rotary encoders 9, and use the obtained speeds for the drive control of the two electric motors 82.

The control circuit 261 computes an inclination angle $\theta$ of the axial line of the upper structure 14 with respect to a vertical (plumb) line according to the signal from the inclination sensor 7 by using a prescribed computing process. The axial line of the lower structure 14 extends along the long axis (or vertical line) of the lower frame 22 as shown in FIG. 3. In the xyz rectilinear coordinate system having an x-axis extending in the fore and aft direction (positive in the forward direction and negative in the rearward direction), a y-axis extending in the lateral direction (positive in the rightward direction and negative in the leftward direction) and a z-axis extending in the vertical direction (positive in the upward direction and negative in the downward direction), the inclination angle $\theta$ may have an x-component $\theta x$ or an inclination angle in the x-axis direction, and a y-component $\theta y$ or an inclination angle in the y-axis direction.

The control circuit 261 performs the inverted pendulum control according to the inclination angle $\theta$. In the inverted pendulum control, the vehicle 1 is moved by using the drive unit 3 so that the combined gravitational center of the vehicle 1 itself and vehicle occupant is positioned approximately above the road contact point of the drive unit 3 (main wheel 85), and the inclination angle $\theta$ coincides with a reference angle $\theta t$ given as a control target value. As the position of the combined gravitational center varies depending on the presence of the vehicle occupant and the riding posture of the vehicle occupant, the reference angle $\theta t$ is defined individually for the vehicle 1 without a vehicle occupant, the vehicle carrying a vehicle occupant in a sitting posture and the vehicle carrying a vehicle occupant in a standing posture.

The control circuit 261 generates PWM signals for controlling the left driver circuit 253 and right driver circuit 254 so as to agree the inclination angle $\theta$ with the reference angle $\theta t$ for each of the vehicle occupant situations. According to the given PWM signals, the left driver circuit 253 and right driver circuit 254 supply electric power to the electric motors 82 to actuate them in a corresponding manner.

The structure described in the foregoing allows the vehicle 1 to maintain an upright posture in which the axial line of the lower structure 14 agrees with the reference angle $\theta t$ by virtue of the inverted pendulum control. The vehicle 1 is driven by the vehicle operator shifting his or her weight in a prescribed direction. When the weight of the vehicle operator is shifted in a desired direction, the axial line of the lower structure tilts in the desired direction. The control circuit 261 then drives the drive unit 3 so as to agree the inclination angle with the reference angle of the corresponding vehicle occupant situation, and this causes the vehicle to travel in the desired direction.

In the vehicle 1 of the first embodiment, when the seat assembly 4 is in the deployed state, the seat surface 70 of each saddle member 63 is slanted laterally downward toward the center of the vehicle 1. Therefore, the buttocks of the vehicle occupant seated on the saddle members 63 are urged or guided toward the center of the vehicle. As a result, when the vehicle occupant is seated on the saddle members 63, the gravitational center of the vehicle occupant is urged toward a position directly above the center of the vehicle, and as this ensures the combined gravitational center of the vehicle 1 loaded by the vehicle occupant to be placed centrally on the vehicle 1, the inverted pendulum control can be performed in an appropriate manner.

The second embodiment of the present invention differs from the first embodiment in the structure of the seat assembly 4, but is otherwise similar to the first embodiment. The seat assembly 400 of the vehicle 1 of the second embodiment is configured to change the inclination angle of the seat surfaces 70A of the left and right saddle members 63 depending on the magnitude of the load applied thereto. In the description of the second embodiment, the parts corresponding to those of the first embodiment are denoted with like numerals without repeating the description of such parts. The features unique to the second embodiment are described in the following with reference to FIGS. 15 and 16.

Figure 15:
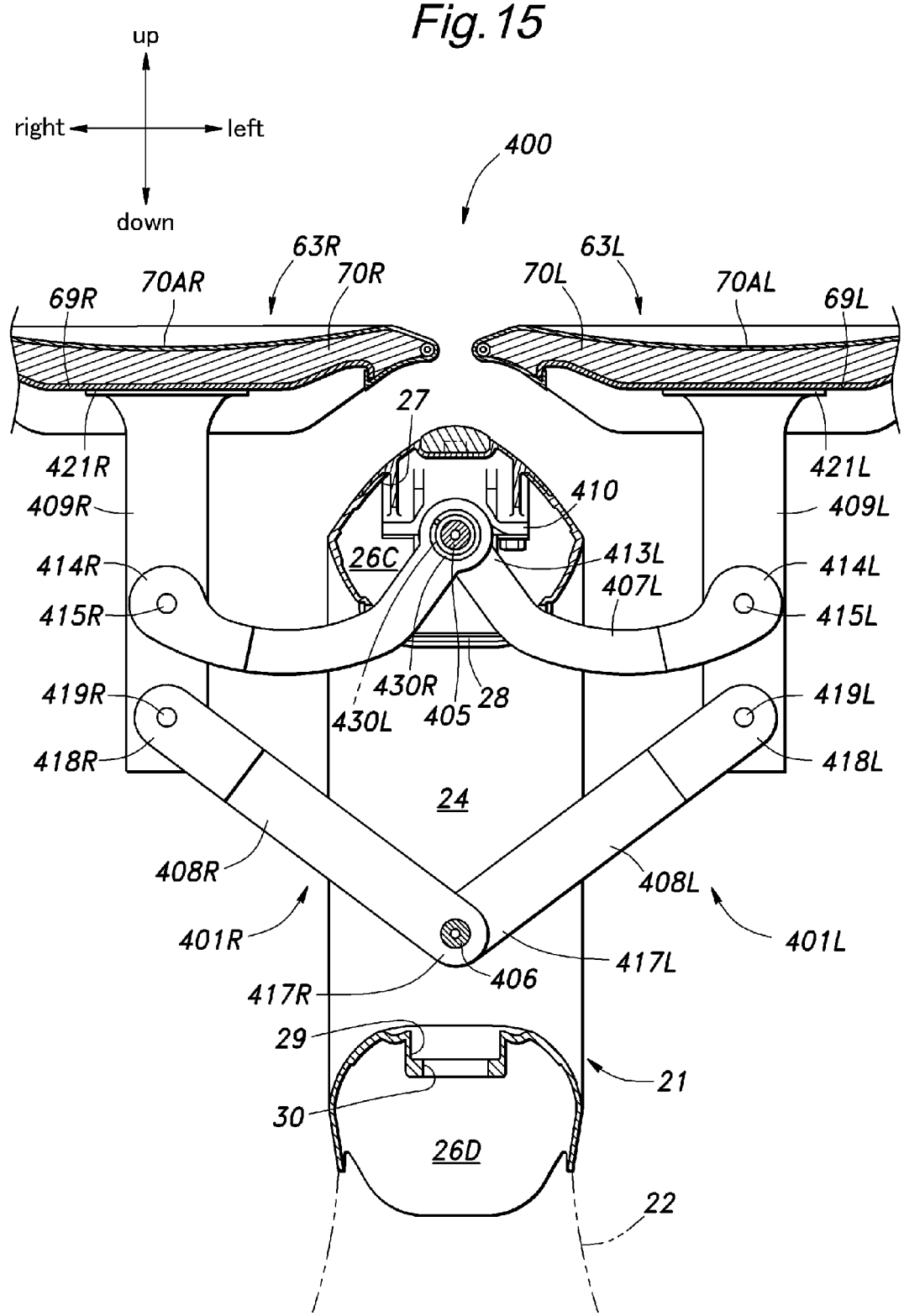
FIG. 15 is a view similar to FIG. 7 showing a second embodiment of the seat assembly according to the present invention.

As shown in FIG. 15, the seat assembly 400 of the second embodiment comprises a pair of saddle members 63 and a pair of four-bar linkage mechanisms 401 each using grounded links (407, 408) of unequal lengths and supporting the corresponding saddle member 63.

As the two four-bar linkage mechanisms 401 are symmetric to each other, only one of them is described in the following. The four-bar linkage mechanism 401 comprises a first pivot shaft 405, a second pivot shaft 406, and upper arm 407, a lower arm 408 and a saddle post 409.

The first pivot shaft 405 consists of a hollow shaft member extending in the fore and aft direction, and is supported at two axial ends thereof by the base member 410 which is placed into the upper space 26C from the upper opening 27 of the upper frame 21. The upper wall of the base member 410 closes the upper opening 27 with the peripheral edge of the upper wall engaging the peripheral wall surrounding the upper opening 27, and fixedly secured to the upper frame 21.

The second pivot shaft 406 also consists of a hollow shaft member extending in the fore and aft direction, and is passed across the saddle storage space 24 in the fore and aft direction with the two axial ends thereof being supported by front wall and rear wall of the upper frame 21 defining the saddle storage space 24.

The upper arm 407 is a bow-shaped arcuate member, and has a base end 413 pivotally supported by the first pivot shaft 405 so as to be rotatable over a prescribed angular range and a free end 414 extending out of the saddle mount opening 28 to the exterior of the upper frame 21. The base end 413 of the upper arm 407 is connected to an end of a torsion coil spring 430 which is wound around the first pivot shaft 405. The other end of the torsion coil spring 430 is connected to the base member 410 so that the free end of the upper arm 407 is resilient urged in the outward and upward direction. Under the spring force of the torsion coil spring 430, the upper arm 407 extends approximately laterally while the middle part thereof curves downward. The free end 414 of the upper arm 407 is bifurcated in the fore and aft direction in the shape of letter U, and a third pivot shaft 415 extends in the fore and aft direction between the two bifurcated parts of the free end 414 of the upper arm 407.

The lower arm 408 extends linearly, and has a base end 417 pivotally supported by the second pivot shaft 406. The free end of the lower arm 408 is bifurcated in the fore and aft direction in the shape of letter U, and a fourth pivot shaft 419 extends in the fore and aft direction between the two bifurcated parts of the free end 418 of the lower arm 408. The length of the lower arm 408 (distance between the second pivot shaft 406 and fourth pivot shaft 419) is longer than the length of the upper arm 407 (distance between the first pivot shaft 405 and third pivot shaft 415).

The saddle post 409 consists of a cylindrical member having a radial flange 421 at an upper end thereof. The lower end of the saddle post 409 is provided with a through hole for receiving the third pivot shaft 415 of the upper arm 407 and a through hole for receiving the fourth pivot shaft 419 of the lower arm 408. The saddle post 409 extends generally in the vertical direction with the upper arm 407 and lower arm 408 pivotally connected thereto via the third pivot shaft 415 and fourth pivot shaft 419, respectively.

Owing to the structure described above, a four-bar linkage mechanism 401 having pivot points at the first pivot shaft 405, second pivot shaft 406, third pivot shaft 415 and fourth pivot shaft 419 is formed. As the upper arm 407 is resiliently biased by the torsion coil spring 430, the saddle post 409 is urged upward, causing the same to be most upwardly displaced position illustrated in FIG. 15. The seat surface 70A of the saddle member 63 may be approximately horizontal or slightly inclined downward toward the center of the vehicle. In this condition, the fourth pivot shaft 419 is located above the second pivot shaft 406.

Figure 16:
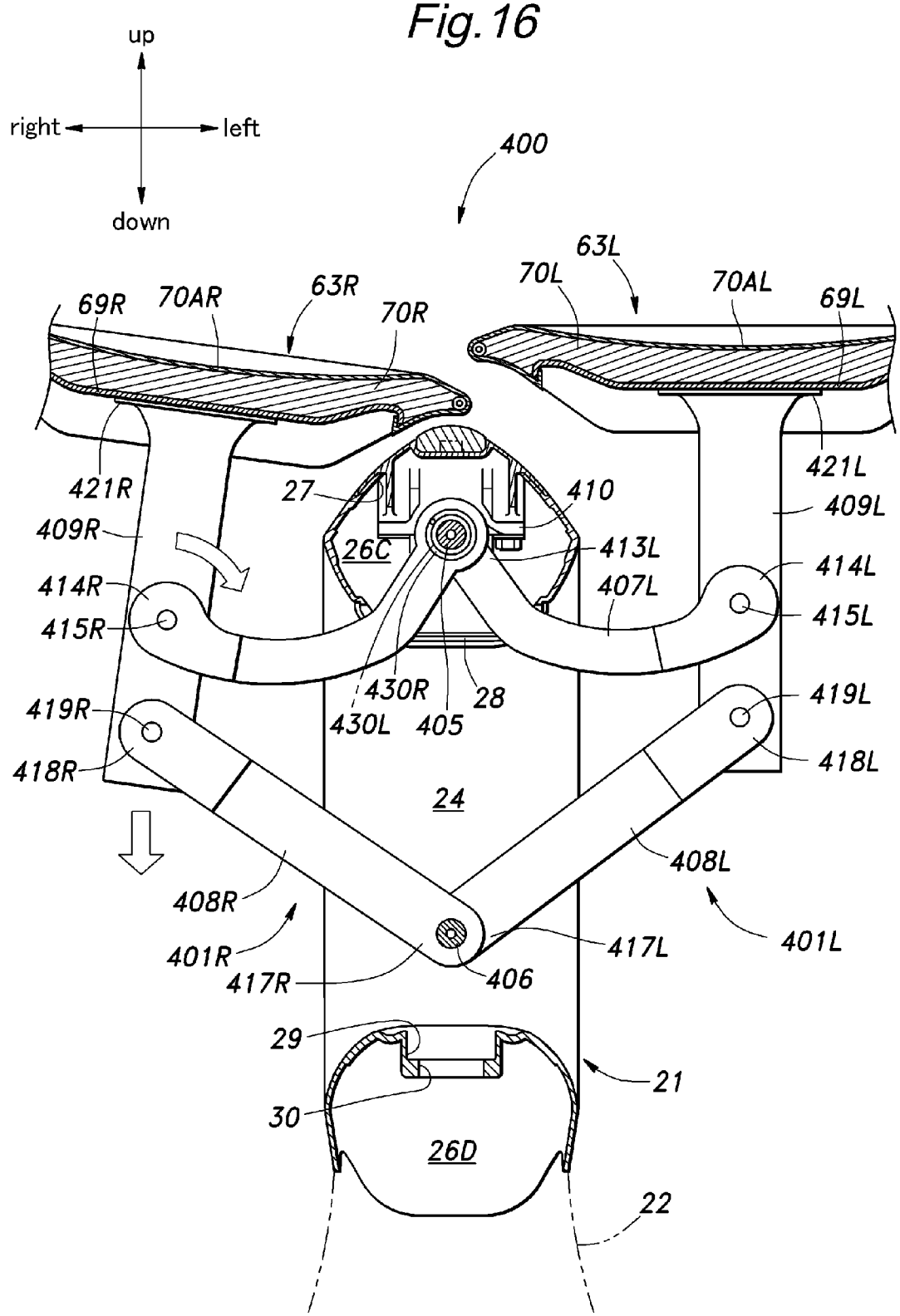
FIG. 16 is a view similar to FIG. 15 showing the mode of operation of the second embodiment.

Because the upper arm 407 is shorter than the lower arm 408, when the saddle post 409 is subjected to a downward load, and is displaced downward against the spring force of the torsion coil spring 430, the upper end of the saddle post 409 tilts laterally toward the center of the vehicle 1 as illustrated on the left hand side of FIG. 16. As a result, when the saddle member 63 is displaced downward, the saddle member 63, or in particular the seat surface 70 thereof, is caused to undergo an inward tilting movement or to tilt laterally downward toward the center of the vehicle 1.

In the seat assembly 400 of the second embodiment, because the two saddle members 63 are supported by the four-bar linkage mechanisms 401 each using grounded links of unequal lengths, as the saddle members 63 move downward against the spring force of the torsion coil springs 430, the seat surfaces 70A of the saddle members 63 tilt downward toward the central part of the vehicle. In other words, as the saddle members 63 move downward, the seat surfaces 70A of the saddle members 63 tilt inward or tilt so as to face toward each other. The downward displacements of the two saddle members 63 may individually vary depending on the distribution of the load between the two saddle members 63. In other words, the inclination angles of the two saddle members 63 may individually vary depending on the distribution of the load between the two saddle members 63.

For instance, when the vehicle occupant is seated on the seat assembly 400 with a rightward offset, as the load acting on the right saddle member 63R is greater than the load acting on the left saddle member 63L, the right saddle member 63R tilts more downward toward the center of the vehicle than the left saddle member 63L (as illustrated in FIG. 16), and, hence, the seat surface 63AR of the right saddle member 63R faces more toward the center of the vehicle 1 than the seat surface 63AL of the left saddle member 63L. As a result, the buttocks of the vehicle occupant are guided by the seat surfaces 63A of the two saddle members 63 toward the center of the vehicle 1, and the gravitational center of the vehicle occupant is displaced toward the center of the vehicle 1.

Although the present invention has been described in terms of a preferred embodiment thereof, it is obvious to a person skilled in the art that various alterations and modifications are possible without departing from the scope of the present invention which is set forth in the appended claims. For instance, the two saddle members 63 in the foregoing embodiments were completely separated from each other, but may also consist of a single seat or two seat members connected together as long as the combined surface is depressed in the laterally middle part and raised in either lateral end part and/or the combined seat member is configured to change the slanting angles of the two lateral halves relative to each other. Also, the application of the present invention is not limited to the inverted pendulum type vehicle but also other vehicles provided with a pair of saddle members defining a pair of seat surfaces, respectively, configured to jointly support buttocks of a vehicle occupant.

The contents of the original Japanese patent application on which the Paris Convention priority claim is made for the present application as well as the contents of any prior art references mentioned in this application are incorporated in this application by reference.

The invention claimed is:

1. A vehicle including a frame incorporated with a drive unit for enabling the frame to travel in a prescribed direction and a seat assembly supported by the frame; the seat assembly comprising:
 a pair of arm members extending laterally outward to either lateral side of the frame and each having a base end pivotally supported by the frame around a pivot center extending in a fore and aft direction;
 a pair of saddle members each pivotally supported by a free end of the corresponding arm member around another pivot center extending in a fore and aft direction, the saddle members defining a pair of seat surfaces, respectively, configured to jointly support buttocks of a vehicle occupant;
 a pair of spring members resiliently urging the arm members, respectively, in an upward direction; and
 a mechanism for maintaining the seat surface of each saddle member in an approximately horizontal orientation and converting a downward movement of each arm member against a spring force of the corresponding spring member into an inward tilting movement of the corresponding saddle member, the mechanism being configured such that downward displacements of the two saddle members may individually vary depending on distribution of load between the two saddle members.

2. The vehicle according to claim 1, wherein each mechanism comprises a first link member pivotally connected to a free end of the corresponding arm member and a second link member pivotally connected to both the frame and the first link member so as to form a four-bar linkage jointly with the frame and arm member, the first link member fixedly supporting the corresponding saddle member.

3. The vehicle according to claim 1, wherein the drive unit is configured to support the vehicle in an upright posture according to a principle of an inverted pendulum.

4. The vehicle according to claim 1, wherein the frame is elongated vertically, and the seat assembly is provided in an upper part of the frame while the drive unit is provided in a lower part of the frame.

5. The vehicle according to claim 1, wherein the seat surfaces are each provided with a slight downward inclination toward a central part of the vehicle during use.

6. The vehicle according to claim 1, wherein the vehicle is configured to travel in both a fore and aft direction and a lateral direction.

7. The vehicle according to claim 1, wherein the seat assembly is movable between an operative position in which the pair of arm members extend laterally to either side of the frame and a storage position in which the pair of arm members are retracted adjacent to the frame.

8. A vehicle including a frame incorporated with a drive unit for enabling the frame to travel in a prescribed direction and a seat assembly supported by the frame; the seat assembly comprising:

a pair of arm members extending laterally to either lateral side of the frame and each having a base end pivotally supported by the frame around a pivot center extending in a fore and aft direction; and a pair of saddle members each supported by a free end of the corresponding arm member, the saddle members defining a pair of seat surfaces, respectively, configured to jointly support buttocks of a vehicle occupant;

the seat surfaces being each provided with a downward inclination toward a central part of the vehicle during use, and wherein the seat assembly is movable between an operative position in which the pair of arm members extend laterally to either side of the frame and a storage position in which the pair of arm members are retracted adjacent to the frame.

9. The vehicle according to claim 8, wherein the vehicle is configured to travel in both a fore and aft direction and a lateral direction.

10. The vehicle according to claim 8, wherein the vehicle drive unit is configured to support the vehicle in an upright posture according to a principle of an inverted pendulum.

11. The vehicle according to claim 8, wherein the frame is elongated vertically, the seat assembly is provided in an upper part of the frame, and the drive unit is provided in a lower part of the frame.

* * * * *